US011777677B2

(12) United States Patent
Bai et al.

(10) Patent No.: US 11,777,677 B2
(45) Date of Patent: Oct. 3, 2023

(54) TECHNIQUES FOR ALIGNING CLUSTERED REFERENCE SIGNAL TONES IN WIRELESS COMMUNICATIONS

(71) Applicant: QUALCOMM Incorporated, San Diego, CA (US)

(72) Inventors: Tianyang Bai, Somerville, NJ (US); Xiaoxia Zhang, San Diego, CA (US); Zhifei Fan, San Diego, CA (US); Tao Luo, San Diego, CA (US); Ahmed Abdelaziz Ibrahim Abdelaziz Zewail, San Diego, CA (US); Jing Sun, San Diego, CA (US); Juergen Cezanne, Ocean Township, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 17/308,704

(22) Filed: May 5, 2021

(65) Prior Publication Data

US 2022/0360387 A1 Nov. 10, 2022

(51) Int. Cl.
*H04W 4/00* (2018.01)
*H04L 5/00* (2006.01)
*H04W 72/0453* (2023.01)

(52) U.S. Cl.
CPC ....... *H04L 5/0048* (2013.01); *H04W 72/0453* (2013.01)

(58) Field of Classification Search
CPC .......................... H04L 5/0048; H04W 72/0453
(Continued)

(56) References Cited

U.S. PATENT DOCUMENTS

2018/0323933 A1* 11/2018 Nam ...................... H04W 72/12
2018/0351719 A1* 12/2018 Lee ........................ H04W 24/08
(Continued)

FOREIGN PATENT DOCUMENTS

WO WO-2018171800 A1 * 9/2018 ........... H04L 5/0023
WO WO-2019048050 A1 * 3/2019 ........... H04L 5/0023

OTHER PUBLICATIONS

CMCC: "Discussion on PT-RS Design", 3GPP TSG RAN WG1 NR Ad-Hoc#2, R1-1710777, 3rd Generation Partnership Project, Mobile Competence Centre, 650, Route Des Lucioles, F-06921 Sophia Antipolis Cedex, France, vol. RAN WG1, No. Qingdao, P.R. China, Jun. 27, 201-Jun. 30, 2017, Jun. 26, 2017, 9 Pages, XP051299981, Sections 3 and 4.

(Continued)

*Primary Examiner* — Maharishi V Khirodhar
(74) *Attorney, Agent, or Firm* — Sevan Savsa; ArentFox Schiff LLP

(57) ABSTRACT

Aspects described herein relate to transmitting or receiving a demodulation reference signal (DMRS) for an antenna port over a set of multiple DMRS frequency tones in a symbol of a slot based on a DMRS configuration, and transmitting or receiving a phase tracking reference signal (PTRS) for the antenna port over a cluster of multiple PTRS frequency tones in the symbol or a different symbol of the slot, wherein the cluster of multiple PTRS frequency tones are adjacent to one another in frequency, and wherein at least one PTRS frequency tone in the cluster of multiple PTRS frequency tones is a non-zero power (NZP) PTRS frequency tone that overlaps, in frequency, at least one DMRS frequency tone in the set of DMRS frequency tones.

30 Claims, 18 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2019/0238295 | A1* | 8/2019 | Lee | H04L 1/00 |
| 2019/0268904 | A1* | 8/2019 | Miao | H04W 52/02 |
| 2020/0153580 | A1* | 5/2020 | Hessler | H04L 27/2613 |
| 2022/0060361 | A1* | 2/2022 | Zhang | H04L 27/2607 |

OTHER PUBLICATIONS

Ericsson: "Design Considerations for Phase Noise Tracking RS (PTRS)", 3GPP TSG-RAN WG1 Meeting #87, R1-1612333, 3rd Generation Partnership Project, Mobile Competence Centre, 650, Route Des Lucioles, F-06921 Sophia-Antipolis Cedex, vol. RAN WG1, No. Reno, USA, Nov. 14, 2016-Nov. 18, 2016, Nov. 5, 2016, 4 Pages, XP051190393, Figure 1, Section 2.1.

International Search Report and Written Opinion—PCT/US2022/071361—ISA/EPO—dated Jun. 30, 2022.

Moderator (VIVO): "Discussion Summary #3 of [104b-e-NR-52-71GHz-05]", 3GPP TSG RAN WG1 Meeting #104bis-e, R1-2104041, 3rd Generation Partnership Project, Mobile Competence Centre, 650, Route Des Lucioles, F-06921 Sophia-Antipolis Cedex, France, vol. RAN WG1, No. E-meeting, Apr. 12, 2021-Apr. 20, 2021, Apr. 20, 2021, 76 Pages, XP051996624, Section 2.3.2.

Moderator (VIVO): "Discussion Summary #3 of [106-e-NR-52-71GHz-05]", 3GPP TSG RAN WG1 Meeting #106-e, R1-2108487, 3rd Generation Partnership Project, Mobile Competence Centre, 650, Route Des Lucioles, F-06921 Sophia-Antipolis Cedex, France, vol. RAN WG1, No. E-meeting, Aug. 16, 2021-Aug. 27, 2021, Aug. 26, 2021, 98 Pages, XP052042774, Section 2.3.

* cited by examiner

TECHNIQUES FOR ALIGNING CLUSTERED REFERENCE SIGNAL TONES IN WIRELESS COMMUNICATIONS

BACKGROUND

Aspects of the present disclosure relate generally to wireless communication systems, and more particularly, to transmitting or receiving reference signals in wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as 5G NR, phase tracking reference signals (PTRS) are defined for tracking noise in millimeter wave (mmW) communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, a memory configured to store instructions, and one or more processors communicatively coupled with the memory and the transceiver. The one or more processors are configured to transmit a demodulation reference signal (DMRS) for an antenna port over a set of multiple DMRS frequency tones in a symbol of a slot based on a DMRS configuration, and transmit a phase tracking reference signal (PTRS) for the antenna port over a cluster of multiple PTRS frequency tones in the symbol or a different symbol of the slot, wherein the cluster of multiple PTRS frequency tones are adjacent to one another in frequency, and wherein at least one PTRS frequency tone in the cluster of multiple PTRS frequency tones is a non-zero power (NZP) PTRS frequency tone that overlaps, in frequency, at least one DMRS frequency tone in the set of DMRS frequency tones.

In another aspect, an apparatus for wireless communication is provided that includes a transceiver, a memory configured to store instructions, and one or more processors communicatively coupled with the memory and the transceiver. The one or more processors are configured to receive a DMRS for an antenna port over a set of multiple DMRS frequency tones in a symbol of a slot based on a DMRS configuration, receive a PTRS for the antenna port over a cluster of multiple PTRS frequency tones in the symbol or a different symbol of the slot, wherein the cluster of multiple PTRS frequency tones are adjacent to one another in frequency, and wherein at least one PTRS frequency tone in the cluster of multiple PTRS frequency tones is a NZP PTRS frequency tone that overlaps, in frequency, at least one DMRS frequency tone in the set of DMRS frequency tones, and adjust a local oscillator of a transceiver based on a phase noise computed from the PTRS.

In another aspect, a method for wireless communication is provided that includes transmitting a DMRS for an antenna port over a set of multiple DMRS frequency tones in a symbol of a slot based on a DMRS configuration, and transmitting a PTRS for the antenna port over a cluster of multiple PTRS frequency tones in the symbol or a different symbol of the slot, wherein the cluster of multiple PTRS frequency tones are adjacent to one another in frequency, and wherein at least one PTRS frequency tone in the cluster of multiple PTRS frequency tones is a NZP PTRS frequency tone that overlaps, in frequency, at least one DMRS frequency tone in the set of DMRS frequency tones.

In another aspect, a method for wireless communication is provided that includes receiving a DMRS for an antenna port over a set of multiple DMRS frequency tones in a symbol of a slot based on a DMRS configuration, receiving a PTRS for the antenna port over a cluster of multiple PTRS frequency tones in the symbol or a different symbol of the slot, wherein the cluster of multiple PTRS frequency tones are adjacent to one another in frequency, and wherein at least one PTRS frequency tone in the cluster of multiple PTRS frequency tones is a NZP PTRS frequency tone that overlaps, in frequency, at least one DMRS frequency tone in the set of DMRS frequency tones, and adjusting a local oscillator of a transceiver based on a phase noise computed from the PTRS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
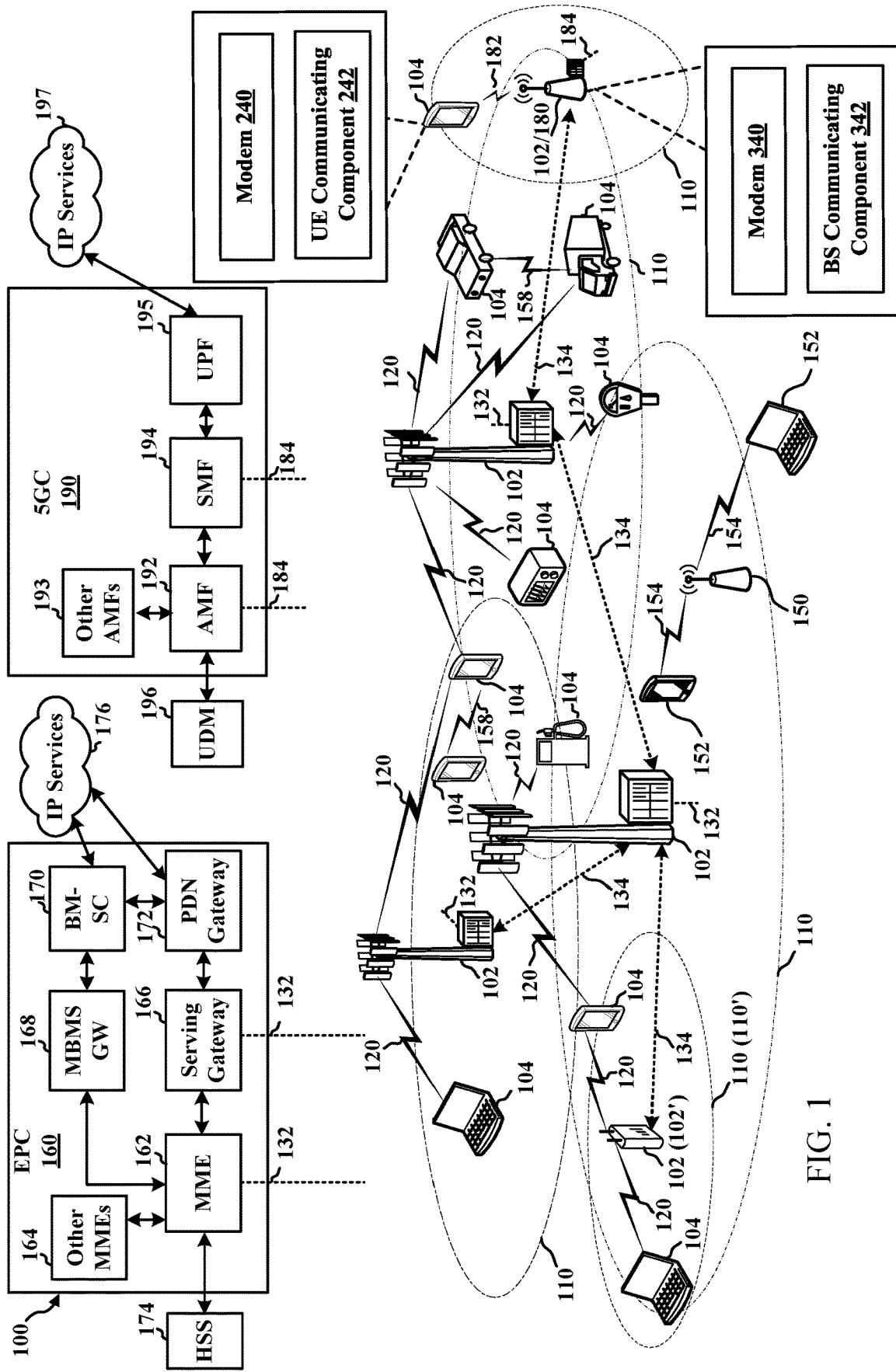
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to bundling tones (or resource blocks (RBs) used for reference signal transmission, which can improve support of high modulation and coding schemes in higher order frequency ranges. In wireless communication technologies such as fifth generation (5G) new radio (NR), phase tracking reference signals (PTRS) are provided for tracking phase noise in millimeter wave (mmW) communications. In this example, a user equipment (UE) can transmit a PTRS to a base station over frequency and time resources allocated for PTRS transmission. The frequency and time resources can include a portion of frequency, such as a resource element (RE), which is also referred to as a subcarrier or frequency tone, within a system bandwidth, over a portion of time, such as a symbol (e.g., orthogonal frequency division multiplexing (OFDM) symbol, single carrier frequency division multiplexing (SC-FDM) symbol, etc.), a portion of a symbol, multiple symbols, a slot of multiple consecutive symbols in time, a frame of multiple slots, etc., and/or combinations of frequency and time, which can include one or more REs in a given symbol, one or more resource blocks (RBs) of one or more REs in a given symbol, etc. In a specific example, in 5G NR, a RB can include 12 REs (or subcarriers) in a symbol. In any case, the base station can receive the PTRS over the allocated resources and can use the PTRS to track phase noise (PN), correct common phase error (CPE) due to PN, Doppler, or other phase impairment on each symbol.

In 5G NR, a distributed PTRS pattern is used for some frequency ranges (FR) (e.g., FR2) where the resource allocation is for one PTRS tone every K resource blocks (RBs), where K=2, 4. In addition, in this example, the PTRS can be in resources that use the same tone as front loaded non-zero power (NZP) demodulation reference signal (DMRS) of the same port. In higher FRs, such as FR4 or sub-terahertz (THz) communications, PN can have larger impact and the distributed PTRS pattern may not allow for accurate CPE or for inter-carrier interference (ICI) correction or cancellation caused by PN, Doppler, etc. In an example, a block PTRS pattern can be used to estimate ICI caused by PN where resources for transmitting PTRSs are allocated in multiple neighboring frequency tones (e.g., frequency tones that are adjacent in frequency). For example, a UE and base station can know the block PTRS pattern and the UE can transmit, and the base station can receive, or the base station can transmit, and the UE can receive, PTRS according to the block PTRS pattern. For example, the base station may configure the UE with the block PTRS pattern.

The block PTRS pattern may include one or more zero power (ZP) frequency tones, which are reserved for PTRS but over which PTRS is not transmitted, and at least one NZP frequency tone. In an example, the received ZP tone may contain ICI leakage from NZP tones, which can be used to estimate ICI. As such, for example, ZP tone can be used as guard tone to prevent ICI leakage from neighboring frequency tones, which may be used for data or other transmissions, into PTRS tones. Different approaches can be used to derive a de-ICI filer (e.g., used to cancel or correct the ICI), such as a time domain method, frequency domain method, etc. Channel estimation for the PTRS tones can be used, e.g. to equalize PTRS tone, before deriving ICI correction filter.

Channel estimation can be performed for the NZP PTRS tones, e.g. to equalize PTRS tone, before deriving de-ICI filter. For ZP PTRS tones, channel estimation may not be needed. Channel estimation can be derived from DMRS symbol of the same antenna port. For example, the antenna port can refer to a physical or virtual antenna port, such that the PTRS and DMRS of the same port share the same precoding. In an example, DMRS symbol may not appear in every tone in the bandwidth (BW) allocated for communications. Rather, the DMRS may have a comb structure, where the DMRS is present in every other tone in one port, and different ports can use the different DMRS tone locations. Channel estimation of the tones where DMRS is present can be directly derived, e.g. from using multiple means squared error (MMSE) estimator on the DMRS. A channel in between DMRS tones can be estimated using frequency domain interpolation (FDI), which may take longer time to compute. Processing delay may be a limiting factor of deriving ICI filter; therefore, it may be desirable to reduce the time for FDI. The channel estimation accuracy of interpolated tones is also lower than the accuracy of DMRS tone. To reduce processing time and improve accuracy, PTRS may be allocated in a cluster of multiple PTRS frequency tones, which may include frequency tones where DMRS is present in the same port (e.g., in different or the same symbol).

Various aspects described herein relate to using the cluster of multiple PTRS frequency tones, which may be adjacent in frequency, for communicating PTRSs. The cluster of multiple PTRS frequency tones can include multiple frequency tones in a symbol, where the multiple frequency tones in a cluster are adjacent in frequency. In addition, at least one of the multiple frequency tones can be allocated for NZP PTRS transmission. Also, for example, at least one of the multiple frequency tones can overlap a frequency tone allocated for DMRS in the same or a different symbol, which can improve channel estimation for the PTRS. In some aspects, clusters of multiple PTRS frequency tones can be allocated and used for each of multiple layers (e.g., each of multiple antenna layers or antenna ports), and the clusters of multiple PTRS frequency tones for multiple layers may be subject to some constraints or allocation strategies with respect to one another. For example, overlapping of frequency tones in each cluster for multiple layers may or may not be allowed (e.g., overlapping in NZP tones, ZP tones, guard band (GB), etc. may or may not be allowed). In yet another example, a direct current (DC) tone of an allocated system bandwidth may be excluded from resources allocated in the cluster of multiple PTRS frequency tones.

In any case, for example, using a cluster of multiple PTRS frequency tones can improve ICI correction or cancellation. In addition, allocating the cluster of multiple PTRS frequency tones to overlap DMRS tones can allow for channel estimation of the PTRS, which can include phase tracking and associated ICI correction or cancellation. The improved ICI correction or cancellation can allow for using higher FR, which can improve wireless communication throughput and user experience in using devices (e.g., UEs) that are capable of operating using the higher FRs.

The described features will be presented in more detail below with reference to FIGS. 1-18.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and UE communicating component 242 for transmitting a PTRS to, or receiving a PTRS from, a base station or other node using a cluster of multiple PTRS frequency tones, in accordance with aspects described herein. In addition, some nodes may have a modem 340 and BS communicating component 342 for transmitting a PTRS to, or receiving a PTRS from, a UE or other node using a cluster of multiple PTRS frequency tones, in accordance with aspects described herein. Though a UE 104 is shown as having the modem 240 and UE communicating component 242 and a base station 102/gNB 180 is shown as having the modem 340 and BS communicating component 342, this is one illustrative example, and substantially any node or type of node may include a modem 240 and UE communicating component 242 and/or a modem 340 and BS communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range.

The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, UE communicating component 242 can transmit or receive a PTRS over resources allocated as a cluster of multiple PTRS frequency tones, and BS communicating component 342 can similarly receive or transmit the PTRS over the resources. In an example, BS communicating component 342 can configure the UE 104 with the resources of the cluster of multiple PTRS frequency tones, or the UE 104 and base station 102 can otherwise know and use the same resource allocation, in accordance with aspects described herein. In some examples, the UE communicating component 242 can transmit or receive, and the BS communicating component 342 can receive or transmit, the PTRS using each of multiple antenna ports or layers, where the resources for each antenna port or layer can be a cluster of multiple PTRS frequency tones that may or may not overlap one another in frequency.

Figure 4:
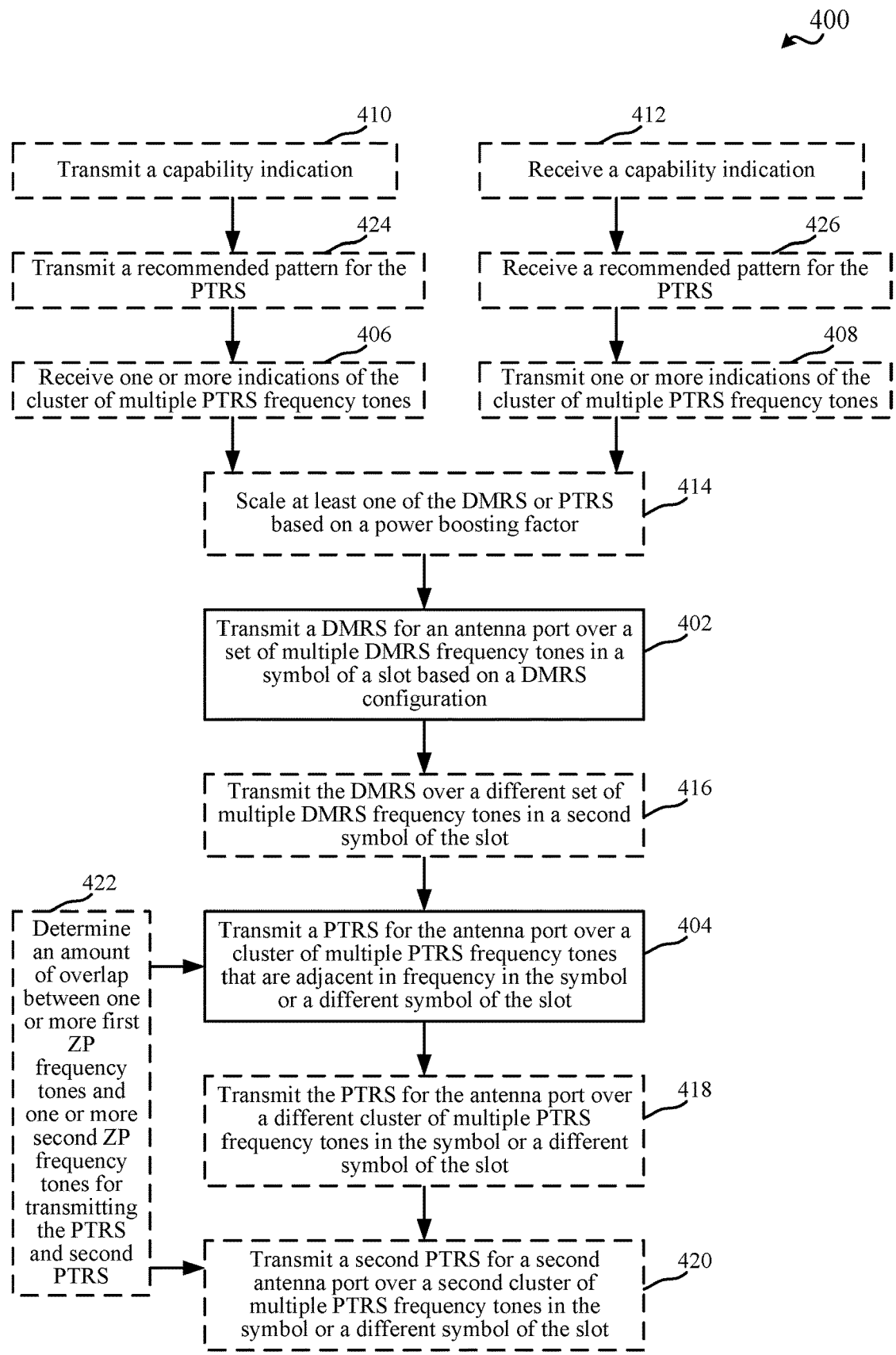
FIG. 4 is a flow chart illustrating an example of a method for transmitting a demodulation reference signal (DMRS) and a phase tracking reference signal (PTRS), in accordance with aspects described herein.
Figure 5:
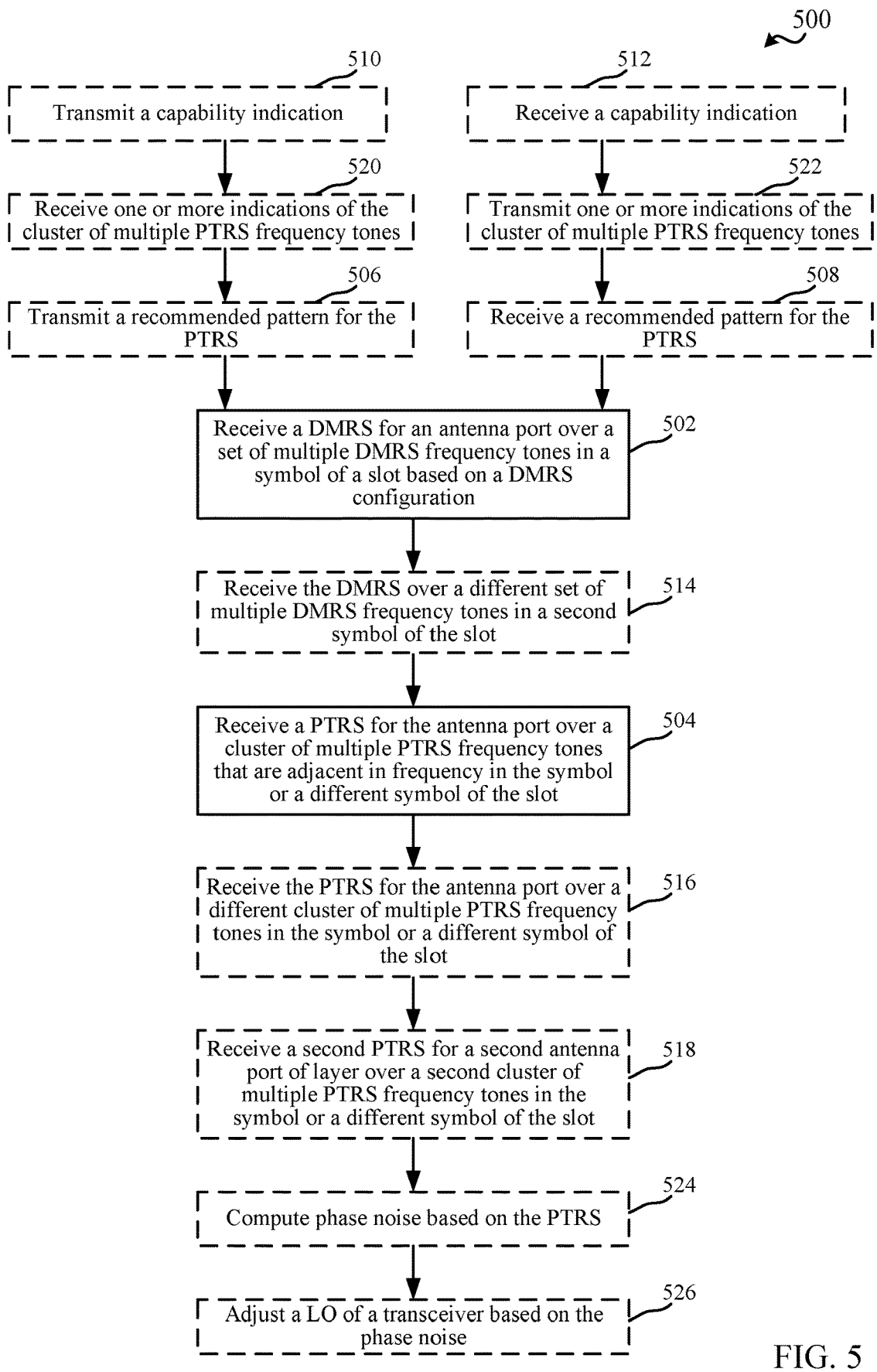
FIG. 5 is a flow chart illustrating an example of a method for receiving a DMRS and a PTRS, in accordance with aspects described herein.

Turning now to FIGS. 2-18, aspects are depicted with reference to one or more components and one or more methods that may perform the actions or operations described herein, where aspects in dashed line may be optional. Although the operations described below in FIGS. 4 and 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 2:
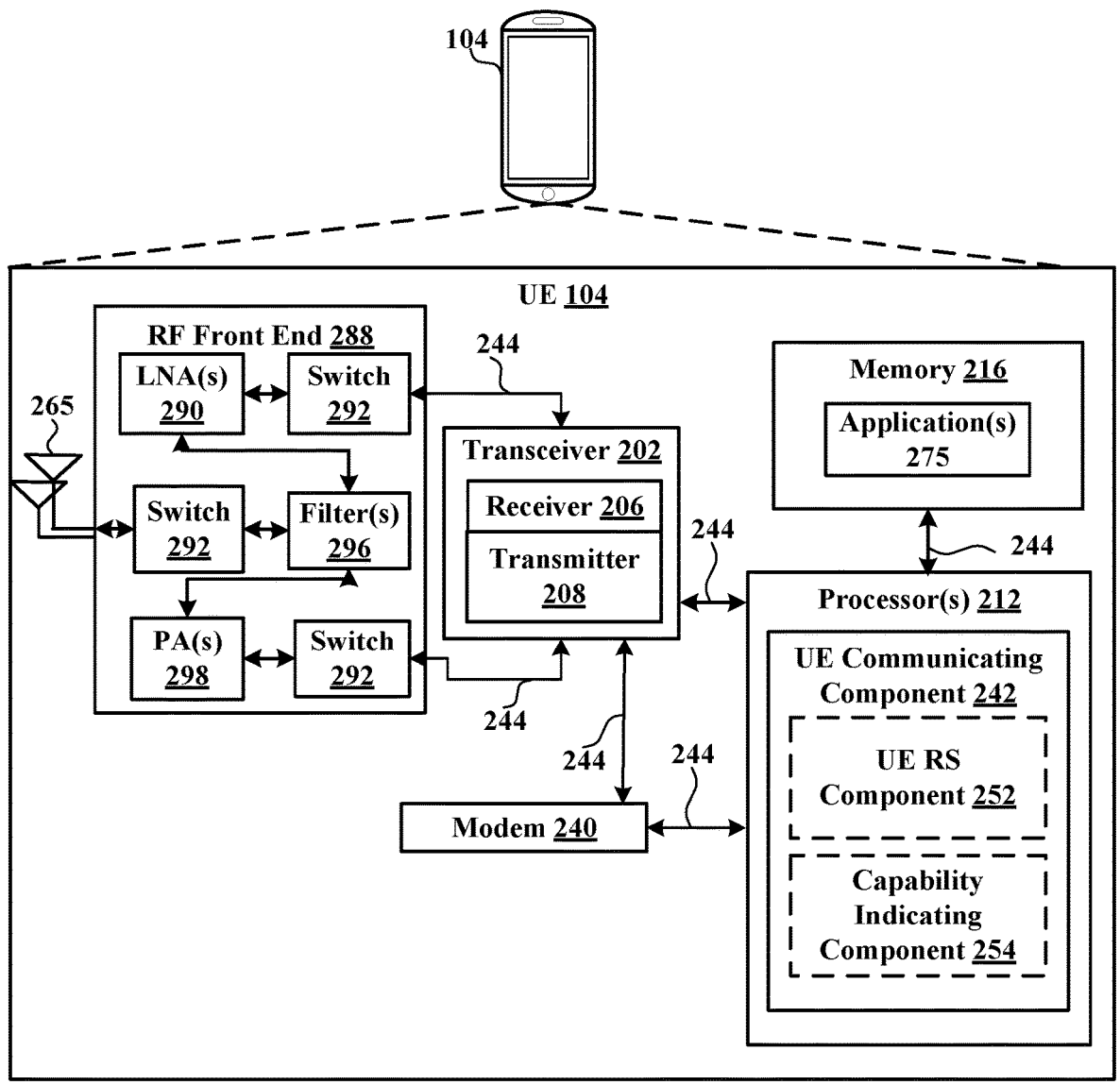
FIG. 2 is a block diagram illustrating an example of a UE, in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or UE communicating component 242 for transmitting a PTRS to, or receiving a PTRS from, a base station or other node using a cluster of multiple PTRS frequency tones, in accordance with aspects described herein.

In an aspect, the one or more processors 212 can include a modem 240 and/or can be part of the modem 240 that uses one or more modem processors. Thus, the various functions related to UE communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with UE communicating component 242 may be performed by transceiver 202.

Also, memory 216 may be configured to store data used herein and/or local versions of applications 275 or UE communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining UE communicating component 242 and/or one or more of its subcomponents, and/or data associated therewith, when UE 104 is operating at least one processor 212 to execute UE communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 242 can optionally include a UE RS component 252 for generating a RS (e.g., PTRS, DMRS, etc.) to be transmitted over, or receiving the RS over, certain allocated or otherwise determined or configured resources, and/or a capability indicating component 254 for indicating a capability regarding transmitting or receiving a PTRS, in accordance with aspects described herein.

In an aspect, the processor(s) 212 may correspond to one or more of the processors described in connection with the UE in FIG. 18. Similarly, the memory 216 may correspond to the memory described in connection with the UE in FIG. 18.

Figure 3:
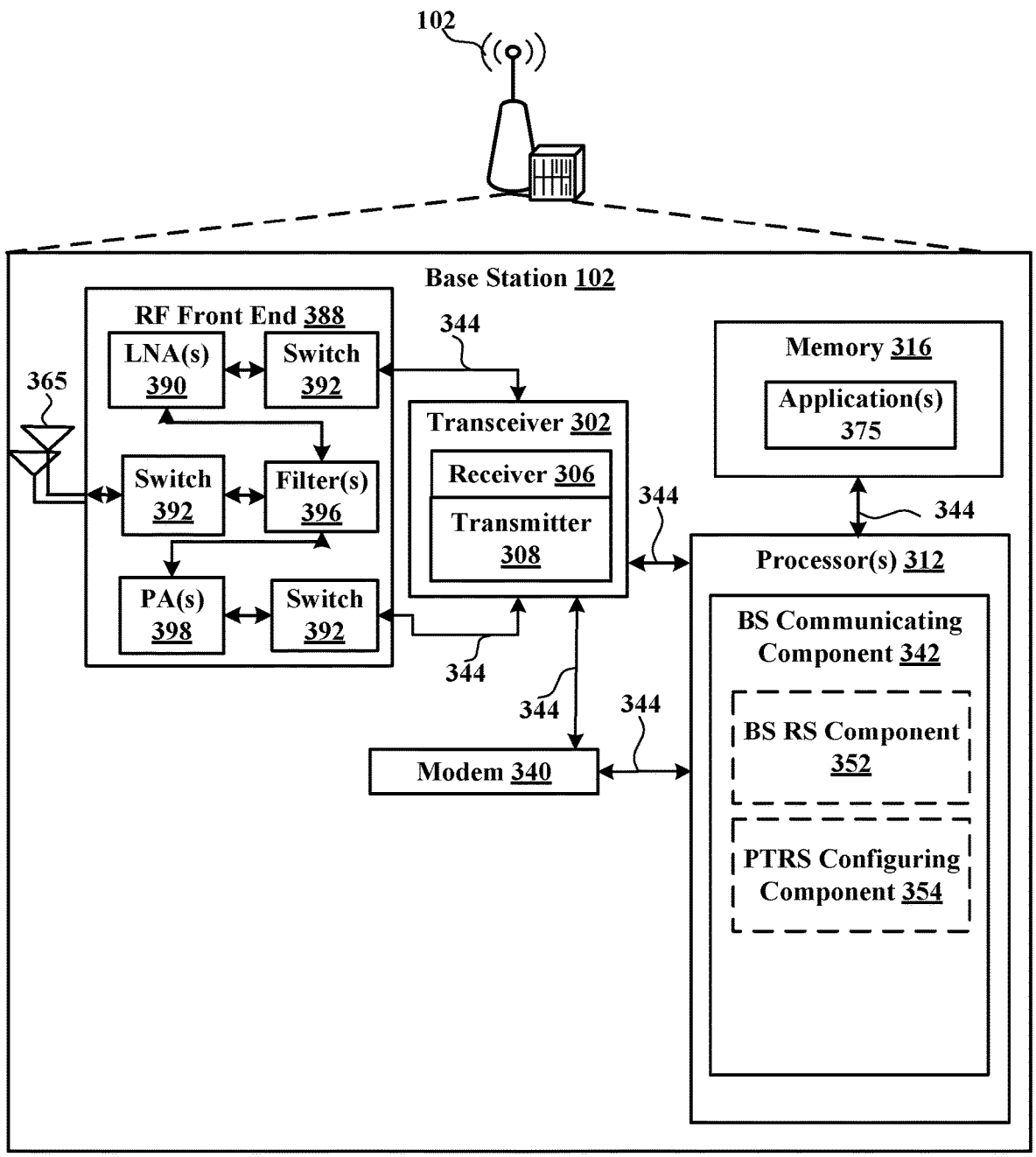
FIG. 3 is a block diagram illustrating an example of a base station, in accordance with various aspects of the present disclosure.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and BS communicating component 342 for transmitting a PTRS to, or receiving a PTRS from, a UE or other node using a cluster of multiple PTRS frequency tones, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, BS communicating component 342 can optionally include a BS RS component 352 for generating a RS (e.g., PTRS, DMRS, etc.) to be transmitted over, or receiving the RS over, certain allocated or otherwise determined or configured resources, and/or a PTRS configuring component 354 for configuring resources for transmitting or receiving the PTRS, in accordance with aspects described herein.

In an aspect, the processor(s) 312 may correspond to one or more of the processors described in connection with the base station in FIG. 18. Similarly, the memory 316 may correspond to the memory described in connection with the base station in FIG. 18.

FIG. 4 illustrates a flow chart of an example of a method 400 for transmitting a PTRS over resources allocated in a cluster of multiple PTRS frequency tones, in accordance with aspects described herein. In an example, a UE 104 or base station 102 can perform the functions described in method 400 using one or more of the components described in FIGS. 1-3.

In method 400, at Block 402, a DMRS for an antenna port can be transmitted over a set of multiple DMRS frequency tones in a symbol of a slot based on a DMRS configuration. In an aspect, UE RS component 252, e.g., in conjunction with processor(s) 212, memory 216, transceiver 202, UE communicating component 242, etc., can transmit (e.g., to a base station or other node) the DMRS for the antenna port over the set of multiple DMRS frequency tones in the symbol of the slot based on the DMRS configuration. For example, the UE 104 can communicate with a base station 102 or other node over multiple antenna ports or layers, and the DMRS can correspond to a given physical or virtual antenna port or layer. For example, an antenna port or layer can include one or more physical antenna ports or layers or one or more virtual antenna ports or layers, where the virtual antenna ports or layers may include one or more physical antenna ports or layers, etc. In any case, for example, signals transmitted or received over a given antenna port or layer can use similar or the same spatial properties (e.g., a same beam or beamforming matrix).

In another aspect, BS RS component 352, e.g., in conjunction with processor(s) 312, memory 316, transceiver 302, BS communicating component 342, etc., can transmit (e.g., to a UE or other node) the DMRS for the antenna port over the set of multiple DMRS frequency tones in the symbol of the slot based on the DMRS configuration. Similarly, the base station 102 may use multiple antenna ports or layers for communication, and the DMRS can correspond to a given physical or virtual antenna port or layer.

In an example, the DMRS configuration can be generated by the base station 102 and provided to the UE 104, and the UE 104 or base station 102 can transmit the DMRS based on the DMRS configuration. For example, UE RS component 252 or BS RS component 352 can transmit the DMRS based on a comb structure (e.g., in alternating frequency tones) of one or more symbols in a slot. In one example, the comb structure of the DMRS can include frequency tones for NZP DMRS (for the antenna layer or port) alternating with ZP DMRS where the DMRS is not transmitted (for the antenna layer or port). In one example, a DMRS for a second antenna layer or port can be transmitting such that ZP DMRS tones for a first antenna layer or port are used to transmit NZP DMRS tones for the second antenna layer or port. In an example, the DMRS can be used to perform demodulation or channel estimation for other transmissions over other symbols in the slot.

In method 400, at Block 404, a PTRS for the antenna port can be transmitted over a cluster of multiple PTRS frequency tones that are adjacent in frequency in the symbol or a different symbol of the slot. In an aspect, UE RS component 252, e.g., in conjunction with processor(s) 212, memory 216, transceiver 202, UE communicating component 242, etc., can transmit (e.g., to a base station or other node) the PTRS for the antenna port over the cluster of multiple PTRS frequency tones that are adjacent in frequency in the symbol or a different symbol of the slot. For example, the UE 104 can transmit the PTRS for the same antenna port or layer as the DMRS, and can accordingly transmit the PTRS using similar spatial properties.

In another aspect, BS RS component 352, e.g., in conjunction with processor(s) 312, memory 316, transceiver 302, BS communicating component 342, etc., can transmit (e.g., to a UE or other node) the PTRS for the antenna port over the cluster of multiple PTRS frequency tones adjacent in frequency in the symbol or a different symbol of the slot. Similarly, the base station 102 can transmit the PTRS for the same antenna port or layer as the DMRS, and can accordingly transmit the PTRS using similar spatial properties.

In an example, the cluster of multiple PTRS frequency tones can be adjacent in frequency (e.g., in neighboring frequency tones) and can be allocated as ZP or NZP frequency tones for PTRS. In an example, the cluster of multiple PTRS frequency tones can include at least one NZP PTRS tone, and can at least partially overlap at least one of the set of multiple DMRS frequency tones, in frequency. For example, at least one NZP PTRS frequency tone in the cluster of multiple PTRS frequency tones can overlap at least one NZP DMRS frequency tone in the set of multiple DMRS frequency tones. This can allow for channel estimation for the PTRS, as described further herein. An example is shown in FIG. 6.

Figure 6:
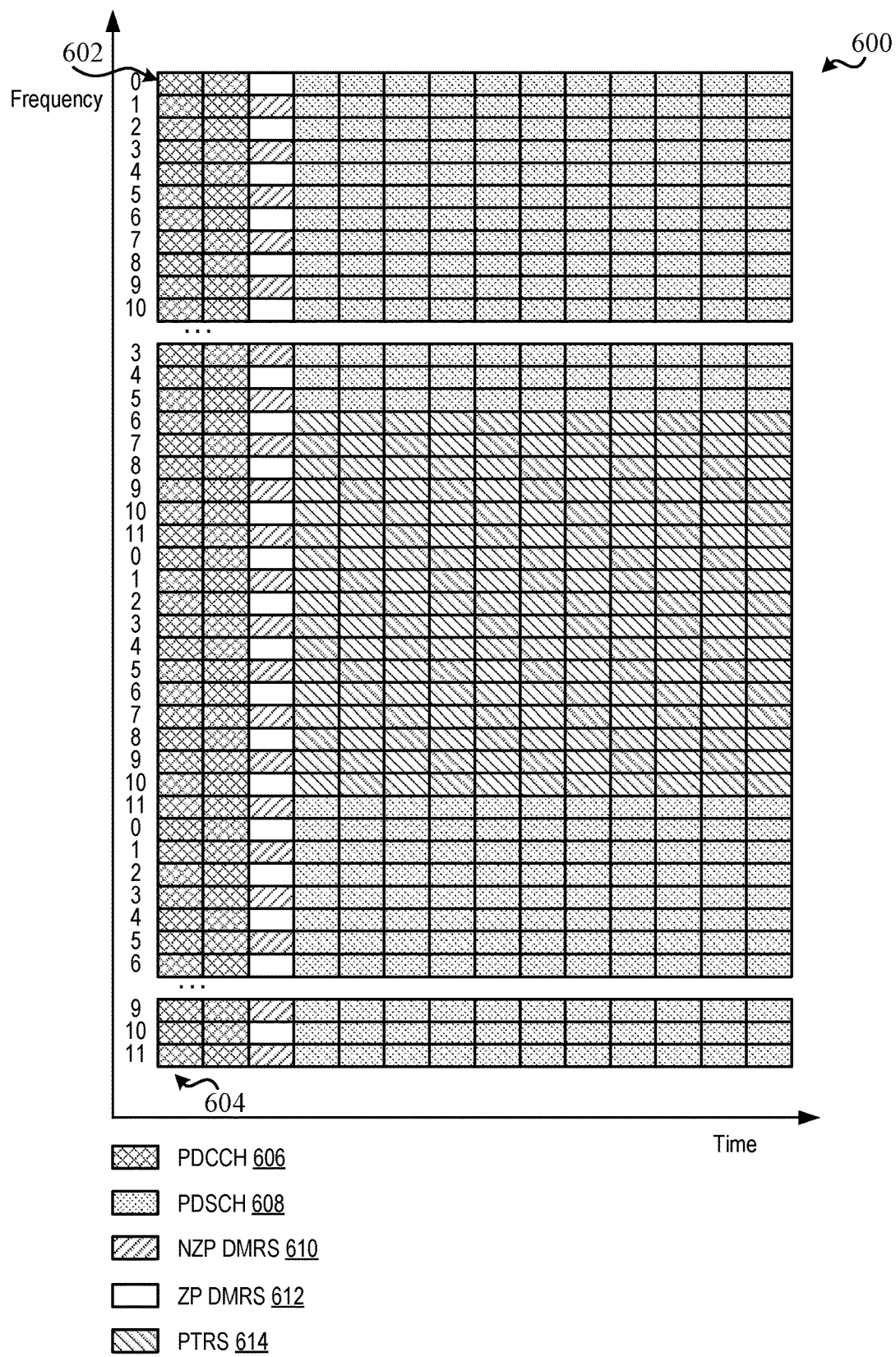
FIG. 6 illustrates an example of a resource allocation including a cluster of PTRS frequency tones, in accordance with aspects described herein.

FIG. 6 illustrates an example of a resource allocation 600 over frequency tones of a frequency band. For example, resource allocation 600 includes multiple frequency tones 602, which are labeled using indices for a given RB (indices 0-11), over each of multiple symbols 604 (e.g., 14 symbols are shown in FIG. 6). The first two symbols can be allocated for physical downlink control channel (PDCCH) 606. The next symbol can be allocated for DMRS using a comb structure of NZP DMRS 610 and ZP DMRS 612. The remaining symbols can be allocated for physical downlink shared channel (PDSCH) 608 (or physical uplink shared channel (PUSCH)). In an example, the DMRS can be used for demodulating or performing channel estimation of PDSCH 608. In addition, for example, one or more clusters of multiple PTRS tones can be allocated for PTRS 614. FIG. 6 shows one cluster, but additional clusters may be allocated as well. In this example, the cluster of multiple PTRS frequency tones for PTRS 614 can be allocated as adjacent in frequency and such that at least one PTRS tone overlaps at least one DMRS tone. In addition, as described further herein, the cluster of PTRS tones may include NZP PTRS tones and/or ZP PTRS tones, and may include at least one NZP PTRS tone. Allocating PTRS in this regard can allow for more accurate ICI determination in higher FRs and can allow for channel estimation based on an overlapping DMRS tone.

Figure 7:
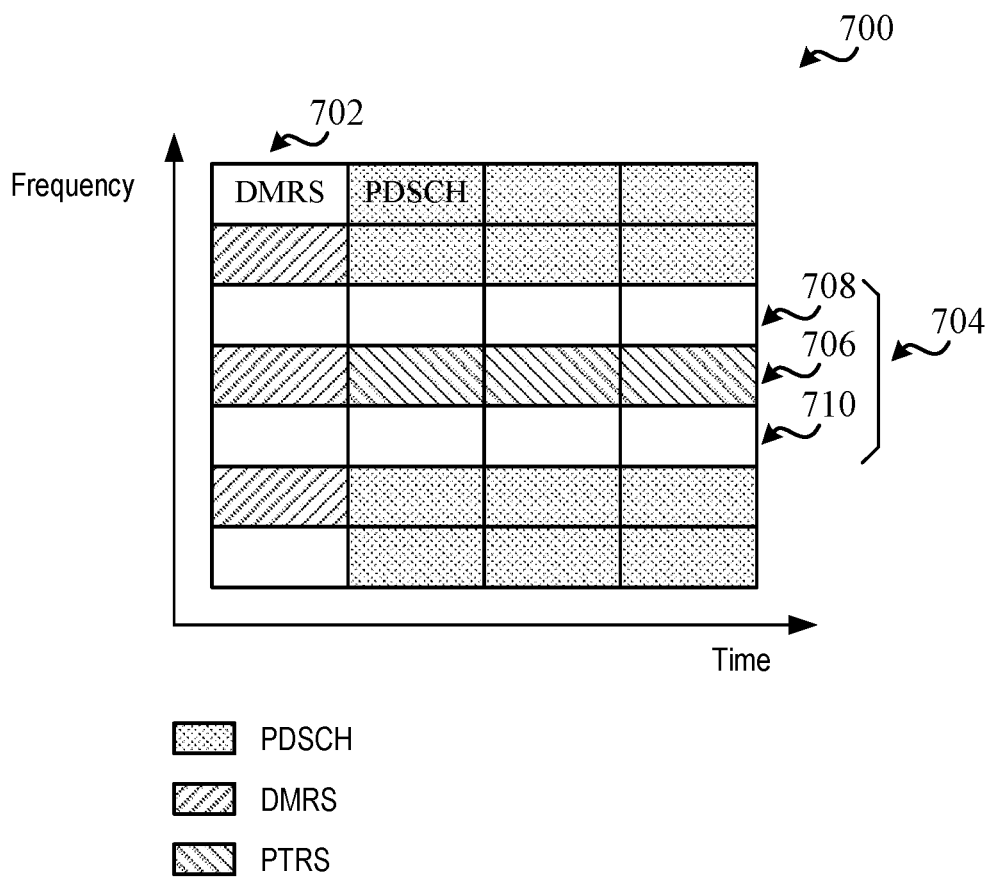
FIG. 7 illustrates an example of a resource allocation including a cluster of PTRS frequency tones having at least one non-zero power (NZP) PTRS frequency tone, in accordance with aspects described herein.

FIG. 7 illustrates another example of a resource allocation 700 over frequency tones of a frequency band. For example, resource allocation 700 includes DMRS tones 702, having the comb structure, and a cluster 704 of PTRS frequency tones over multiple symbols in a PDSCH region. For example, the cluster 704 can include a NZP PTRS frequency tone 706, which uses the same or similar frequency as a NZP DMRS frequency tone, and ZP PTRS frequency tones 708, 710 on either side of the NZP PTRS frequency tone 706. The ZP PTRS frequency tones 708, 710 may not be measured, but may allow for leakage from NZP PTRS frequency tone 706 without significant impact to PDSCH communications.

In method 400, optionally at Block 406, one or more indications of the cluster of multiple PTRS frequency tones can be received. In an aspect, UE RS component 252, e.g., in conjunction with processor(s) 212, memory 216, transceiver 202, UE communicating component 242, etc., can receive the one or more indications of the cluster of multiple PTRS frequency tones. For example, the UE 104 can receive the one or more indications in one or more configurations from the base station 102, in memory 216 of the UE 104, which may store hardcoded information or a configuration based on a wireless communication technology standard, such as 5G NR, and/or the like.

In one example, UE RS component 252 can receive, from the base station 102, a list identifying possible clusters of PTRS frequency tones (e.g., identifying each possible cluster as a list of frequency tones, which may be by frequency tone index or a range of indices, etc.) in radio resource control (RRC) or other higher layer signaling. In this example, UE RS component 252 can receive the one or more indications as a selection of the one or more clusters from a list, which may be received in downlink control information (DCI) over PDCCH, media access control (MAC)-control element (CE), etc. For example, the list of possible clusters can include indices of each cluster, and the one or more indications may indicate an index from the list for one (or more) clusters for transmitting PTRS for one (or more) antenna layers.

In method 400, optionally at Block 408, one or more indications of the cluster of multiple PTRS frequency tones can be transmitted. In an aspect, PTRS configuring component 354, e.g., in conjunction with processor(s) 312, memory 316, transceiver 302, BS communicating component 342, etc., can transmit the one or more indications of the cluster of multiple PTRS frequency tones. For example, the base station 102 can transmit the one or more indications in one or more configurations to the UE 104, as described. For example, In one example, PTRS configuring component 354 can transmit, to the UE 104, a list identifying possible clusters of PTRS frequency tones (e.g., in RRC signaling) and/or DCI or MAC-CE with the one or more indications (e.g., indications of an index within the RRC-configured list) of selected cluster(s) for one or more antenna ports. In one example, PTRS configuring component 354 can configure the cluster(s) of PTRS frequency tones based on a capability indicated by the UE 104.

In method 400, optionally at Block 410, a capability indication can be transmitted. In an aspect, capability indicating component 254, e.g., in conjunction with processor(s) 212, memory 216, transceiver 202, UE communicating component 242, etc., can transmit the capability indication (e.g., to the base station 102). For example, capability indication component 254 can transmit the capability indication in RRC signaling. For example, the capability indication can include an indication of a PTRS cluster size supported by the UE 104 (e.g., per antenna port and/or per allocated bandwidth), a total number of PTRS clusters supported by the UE 104 (e.g., per antenna port and/or per allocated bandwidth), a cluster pattern (e.g., a number of ZP PTRS frequency tones supported in a cluster of PTRS frequency tones), which may be a function of modulation and coding scheme (MCS) and/or bandwidth, etc. For example, higher MCS larger BW may use more ZP PTRS; while for lower MCS may use less or no ZP PTRS.

In method 400, optionally at Block 412, a capability indication can be received. In an aspect, PTRS configuring component 354, e.g., in conjunction with processor(s) 312, memory 316, transceiver 302, BS communicating component 342, etc., can receive the capability indication (e.g., from the UE). For example, PTRS configuring component 354 can receive the capability indication in RRC signaling from the UE 104. PTRS configuring component 354 can determine the cluster of PTRS frequency tones based on the capability indication, and/or can transmit the one or more indications, at Block 408, based on the capability indication. For example, PTRS configuring component 354 can determine a size of one or more clusters of PTRS frequency tones to allocate for the UE 104, a total number of clusters to allocate for the UE 104, the pattern of the clusters (e.g., the pattern of ZP and NZP PTRS frequency tones, which may include the number of ZP and NZP frequency tones, locations within frequency of ZP and NZP frequency tones, etc.), and/or the like, which may apply for one or multiple antenna ports, based on the capability indication. In any case, PTRS configuring component 354 can configure the one or more clusters of PTRS frequency tones for the UE 104, whether by selecting from a previously configured list of clusters or otherwise.

In yet another example, the one or more indications can include a RRC table of multiple clusters, and in this example, configuring component 354 can configure the clusters in an RRC table of multiple clusters, which may be generated based on the UE capability indication. In this example, UE RS component 252 can receive the RRC table including the list of multiple clusters (and/or information related to identifying the frequency tones that are in each cluster). In an example, the RRC table can include clusters to use for different MCSs and/or bandwidths, and UE RS component 252 and/or BS RS component 352 can determine which cluster to use in transmitting the PTRS based on the determined MCS to use (e.g., quadrature amplitude modulation (QAM), 16-QAM, 64-QAM, etc.) or allocated bandwidth (e.g., the location in frequency of the allocated bandwidth, channel number, amount of allocated bandwidth, etc.) for communications between the base station 102 and UE 104 (e.g., PDSCH, PUSCH, etc.).

In a further example, the one or more indications can include a parameter (e.g., RRC parameter) indicating to determine one cluster of multiple PTRS frequency tones (also referred to herein as a "PTRS bundle") every X number of RBs (e.g., an interval for the PTRS frequency tones within the bandwidth), or in total Y number of PTRS bundles for a bandwidth (e.g., PDSCH or PUSCH BW), and in this example, configuring component 354 can configure the parameter for the UE 104, which may be generated based on the UE capability indication. In this example, UE RS component 252 can receive the parameter, and/or UE RS component 252 and/or BS RS component 352 can determine location in frequency of the PTRS bundle of PTRS frequency tones based on the parameter X and/or Y. For example, UE RS component 252 and/or BS RS component 352 can determine at least a first PTRS bundle at a first DMRS frequency tone location, and can determine at least a second PTRS bundle at frequency tone locations that are X RBs from the first PTRS bundle (e.g., from the first or last RB in the first PTRS bundle). In another example, UE RS component 252 and/or BS RS component 352 can determine a substantially even spacing in frequency between PTRS bundles based on the bandwidth allocation size and the parameter Y total number of PTRS bundles.

In another example, the one or more indications can include a parameter (e.g., RRC parameter) indicating a tone identifier within an RB that includes a PTRS bundle to insert PTRS (e.g., a starting frequency tone of the bundle in an RB for PTRS), and in this example, configuring component 354 can configure the parameter for the UE 104, which may be generated based on the UE capability indication. In this example, UE RS component 252 can receive the parameter, and/or UE RS component 252 and/or BS RS component 352 can determine location in frequency of the starting tone for the PTRS bundle based on the tone identifier. For example, the tone identifier may be an index of the tone within the RB (e.g., 0-11, where the RB includes 12 frequency tones).

In yet another example, the one or more indications can include a parameter (e.g., RRC parameter) indicating the pattern of PTRS tones within a PTRS bundle (e.g., frequency tone locations of ZP and NZP PTRS tones within each of one or more PTRS bundles), and in this example, configuring component 354 can configure the parameter for the UE 104, which may be generated based on the UE capability indication. In this example, UE RS component 252 can receive the parameter, and/or UE RS component 252 and/or BS RS component 352 can determine location in frequency of each ZP and/or NZP PTRS tone within each of one or more PTRS bundles.

In any of the above examples, UE RS component 252 and/or BS RS component 352 can transmit the PTRS (e.g., at Block 404) by transmitting NZP PTRS tones (and/or by transmitting with zero power, or refraining from transmitting, ZP PTRS tones) in determined frequency tones throughout a bandwidth in one or more symbols of the slot.

In method 400, optionally at Block 414, at least one of the DMRS or PTRS can be scaled based on a power boosting factor. In an aspect, UE RS component 252, e.g., in conjunction with processor(s) 212, memory 216, transceiver 202, UE communicating component 242, etc., can scale at least one of the DMRS or PTRS based on the power boosting factor before transmitting DMRS and PTRS. In this example, where UE RS component 252 transmits DMRS and PTRS in the same symbol (e.g., in the same modulated symbol and/or over the same frequency tone), UE RS component 252 can apply power boosting to one or the other signal such that the scaling of the symbol may be different. In one example, UE RS component 252 can receive the one or more indications at Block 406 including an indication of the power boosting to be applied to PTRS. In another example, UE RS component 252 can receive the one or more indications at Block 406 including an indication of a number of ZP frequency tones in a PTRS bundle, and UE RS component 252 can determine the power boosting to be applied to PTRS based on the number of ZP frequency tones.

In another aspect, BS RS component 352, e.g., in conjunction with processor(s) 312, memory 316, transceiver 302, BS communicating component 342, etc., can scale at least one of the DMRS or PTRS based on the power boosting factor before transmitting DMRS and PTRS. In this example, where BS RS component 352 transmits DMRS and PTRS in the same symbol (and/or over the same frequency tone), BS RS component 352 can apply power boosting to one or the other signal such that the scaling of the symbol may be different. In one example, BS RS component 352 can determine the power boosting to be applied to PTRS based on the number of ZP frequency tones allocated in a PTRS bundle of frequency tones.

In an example, in transmitting the PTRS over the cluster of multiple PTRS frequency tones, UE RS component 252, or BS RS component 352, can determine or include a guard band of one or more guard tones on either side of the cluster. Using guard band, for example, can compensate for possible leakage from signals transmitted in the PTRS cluster on either side of the cluster in frequency without significant impact to other communications. An example is shown in FIG. 8.

Figure 8:
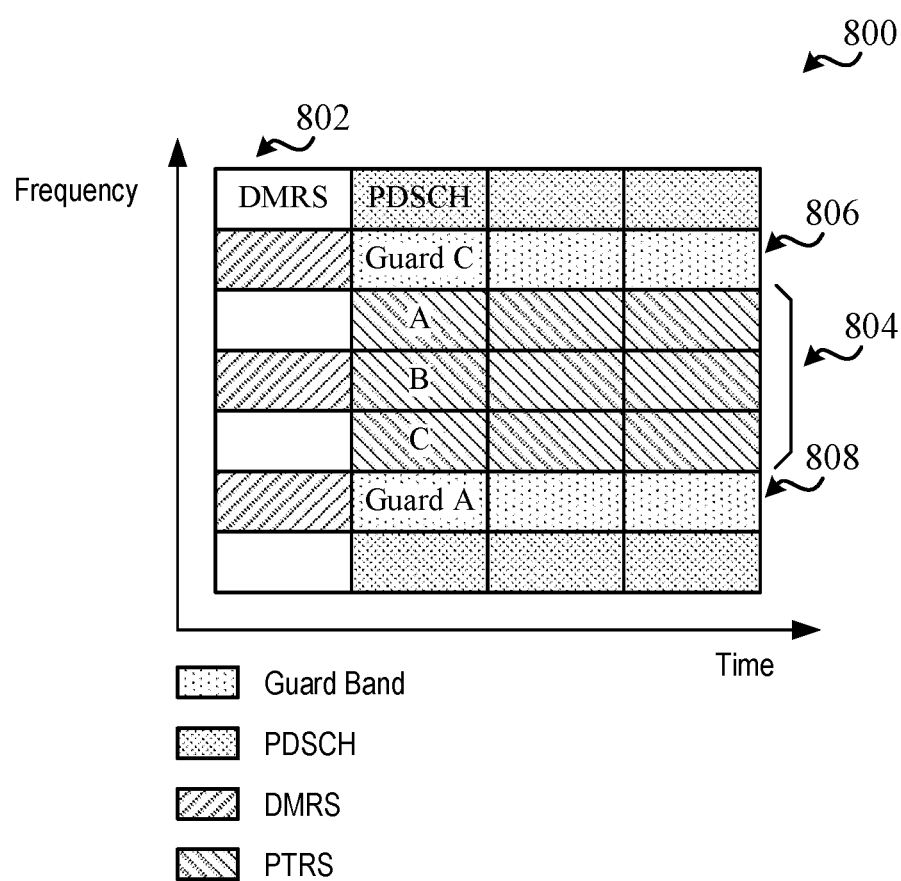
FIG. 8 illustrates an example of a resource allocation including a cluster of PTRS frequency tones including a guard band, in accordance with aspects described herein.

FIG. 8 illustrates another example of a resource allocation 800 over frequency tones of a frequency band. For example, resource allocation 800 includes DMRS tones 802, having the comb structure, and a cluster 804 of PTRS frequency tones over multiple symbols in a PDSCH region. For example, the cluster 804 can include multiple NZP PTRS frequency tones, at least one of which uses the same or similar frequency as a NZP DMRS frequency tone. In an example, UE RS component 252, or BS RS component 352, can determine or include the guard bands 806, 808 on either edge of the cluster 804, which can allow for leakage from NZP PTRS frequency tones in cluster 804 without significant impact to PDSCH communications. For example, the guard bands 806, 808, or corresponding tones, may not be used to measure PTRS or derive an ICI filter, as described further herein. In an example, the guard bands 806, 808, or corresponding tones, can be ZP or NZP. In an example, an NZP guard tone may or may not correspond to a DMRS tone (e.g., as the guard tone may not be used in deriving ICI filter). In an example, UE RS component 252, or BS RS component 352, can add the guard band 806, 808, or corresponding tones, as ZP or NZP guard tones. Where the UE RS component 252, or BS RS component 352, adds the guard tones as NZP tones, for example, the guard tones may be added in a cyclic prefix (CP) configuration, which can simply time domain (TD) processing. As shown in FIG. 8, for example, where the cluster 804 has a pattern A, B, C of transmitted tones, UE RS component 252, or BS RS component 352, can add the guard bands 806, 808, or corresponding tones, to continue the pattern (e.g., guard band C 806 as the previous PTRS before the pattern A, B, C, and guard band A 808 as the next PTRS in the pattern after A, B, C).

Figure 9:
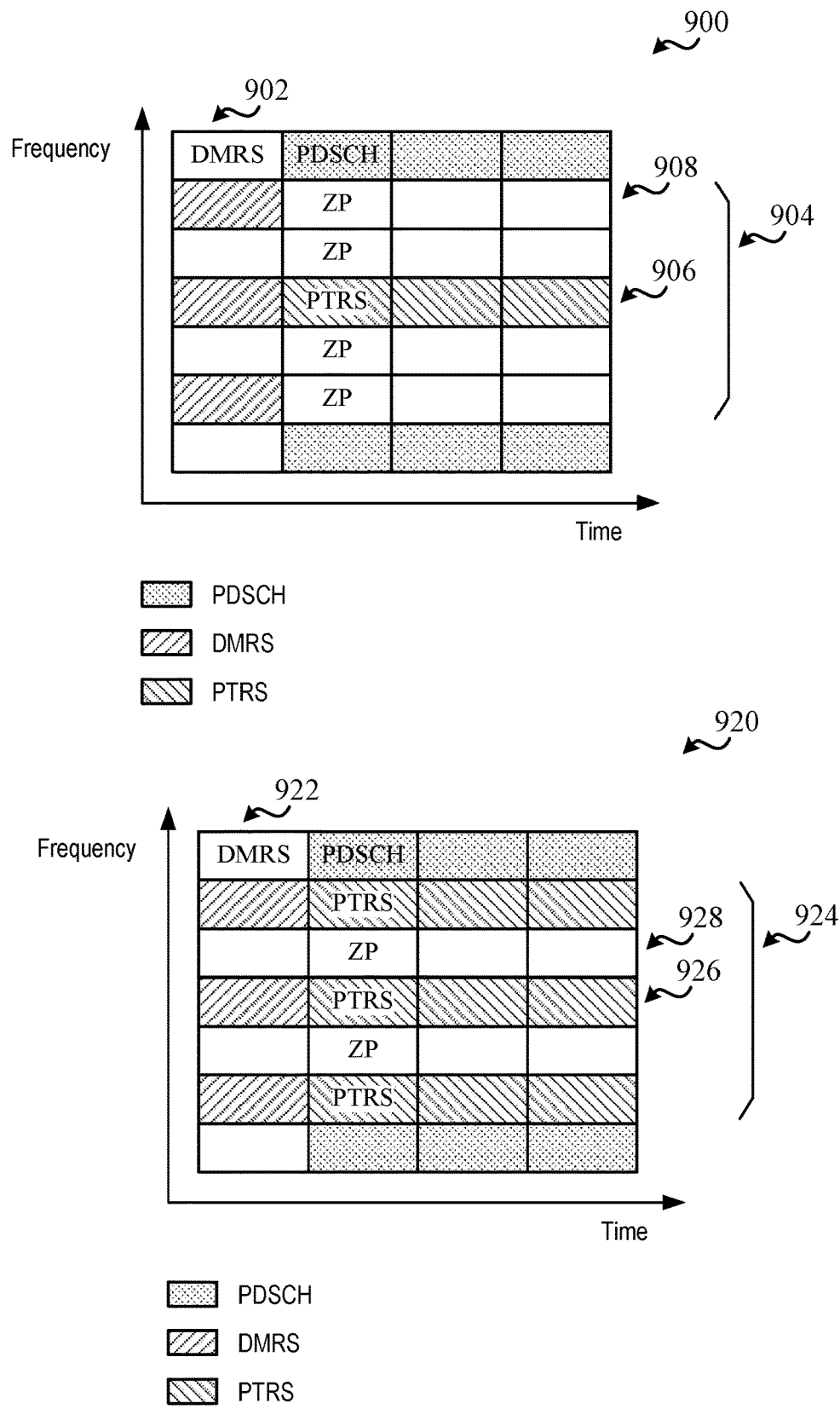
FIG. 9 illustrates examples of resource allocations including a cluster of PTRS frequency tones having zero power (ZP) PTRS frequency tones and NZP PTRS frequency tones, in accordance with aspects described herein.

FIG. 9 illustrates another example of resource allocations 900, 920 over frequency tones of a frequency band. For example, resource allocation 900 includes DMRS tones 902, having the comb structure, and a cluster 904 of PTRS frequency tones over multiple symbols in a PDSCH region. For example, the cluster 904 can include one NZP PTRS frequency tone 906, centered in the cluster 904 and which uses the same or similar frequency as a NZP DMRS frequency tone, as well as multiple ZP PTRS frequency tones 908. In this example, each cluster of PTRS frequency tones in the bandwidth can include one NZP PTRS frequency tone. For example, the cluster 904 can include an odd number of tones, where the NZP PTRS is in the middle of the cluster. In an example, NZP PTRS power can be boosted from ZP PTRS, and the edge ZP PTRS in a bundle may be used as guard tone and not be used to estimate ICI, therefore putting zero power in guard tone helps boost power. In another example, using a single NZP tone in the cluster can reduce receiver (Rx) complexity to derive de-ICI filter. In time domain processing, single NZP tone pattern can also correspond to equal magnitude time domain sequence, which can help improve performance.

In another example, resource allocation 920 includes DMRS tones 922, having the comb structure, and a cluster 924 of PTRS frequency tones over multiple symbols in a PDSCH region. For example, the cluster 924 can include multiple NZP PTRS frequency tones 926 as well as multiple ZP PTRS frequency tones 928. In this example, each PTRS frequency tone 926 uses a same or similar frequency as a NZP DMRS frequency tone. This may facilitate more accurate PN tracking or ICI correction by using more PTRS tones for determining the PN or ICI.

In method 400, optionally at Block 416, the DMRS can be transmitted over a different set of multiple DMRS frequency tones in a second symbol of the slot. In an aspect, UE RS component 252, e.g., in conjunction with processor(s) 212, memory 216, transceiver 202, UE communicating component 242, etc., can transmit the DMRS over a different set of multiple DMRS frequency tones in a second symbol of the slot. In another aspect, BS RS component 352, e.g., in conjunction with processor(s) 312, memory 316, transceiver 302, BS communicating component 342, etc., can transmit the DMRS over a different set of multiple DMRS frequency tones in a second symbol of the slot. In one example, the DMRS can be a second DMRS that corresponds to a second antenna port (or layer). In either example, the PTRS frequency tones may or may not overlap any of the frequency tones in the different set of multiple DMRS frequency tones.

In method 400, optionally at Block 418, the PTRS for the antenna port can be transmitted over a different cluster of multiple PTRS frequency tones in the symbol or a different symbol of the slot as well. In an aspect, UE RS component 252, e.g., in conjunction with processor(s) 212, memory 216, transceiver 202, UE communicating component 242, etc., can transmit the PTRS for the antenna port over the different cluster of multiple PTRS frequency tones in the symbol or the different symbol of the slot. In another aspect, BS RS component 352, e.g., in conjunction with processor(s) 312, memory 316, transceiver 302, BS communicating component 342, etc., can transmit the PTRS for the antenna port over the different cluster of multiple PTRS frequency tones in the symbol or the different symbol of the slot. In this example, the UE RS component 252 and/or BS RS component 252 can transmit the PTRS over multiple clusters of PTRS frequency tones, as described. Referring to FIG. 7, for example, cluster 704 may be one of multiple clusters in an allocated bandwidth that are used to transmit the PTRS for a given antenna port or layer over the same or different set of symbols in a slot.

In method 400, optionally at Block 420, a second PTRS for a second antenna port can be transmitted over a second cluster of multiple PTRS frequency tones in the symbol or a different symbol of the slot as well. In an aspect, UE RS component 252, e.g., in conjunction with processor(s) 212, memory 216, transceiver 202, UE communicating component 242, etc., can transmit the second PTRS for the second antenna port over the second cluster of multiple PTRS frequency tones in the symbol or the different symbol of the slot. In another aspect, BS RS component 352, e.g., in conjunction with processor(s) 312, memory 316, transceiver 302, BS communicating component 342, etc., can transmit the second PTRS for the second antenna port over the second cluster of multiple PTRS frequency tones in the symbol or the different symbol of the slot. For example, if multiple antenna ports or layers share the same PN or phase errors, NZP PTRS for one port (e.g., in one layer) may be sufficient. Otherwise, NZP PTRS can be inserted for multiple ports (or layers) where phase errors differ in the ports (or layers). In one example, the PTRS for the second antenna port may use a same or similar frequency tone as DMRS for the second antenna port (e.g., as transmitted in Block 416). In an example, the PTRS clusters for multiple layers may use different clusters of PTRS frequency tones that may be subject to one or more overlapping constraints with respect to one another. In addition, in an example, each cluster of PTRS frequency tones for each of multiple antenna ports can use a tone location where its corresponding DMRS is present, can be transmitted using power boosting, etc., as described above. Various examples are described herein.

In one example, UE RS component 252, or BS RS component 352, can transmit the PTRS and the second PTRS in respective clusters of PTRS frequency tones where the respective clusters do not overlap in frequency, or only overlap in guard band. Examples are shown in FIGS. 10-13.

Figure 10:
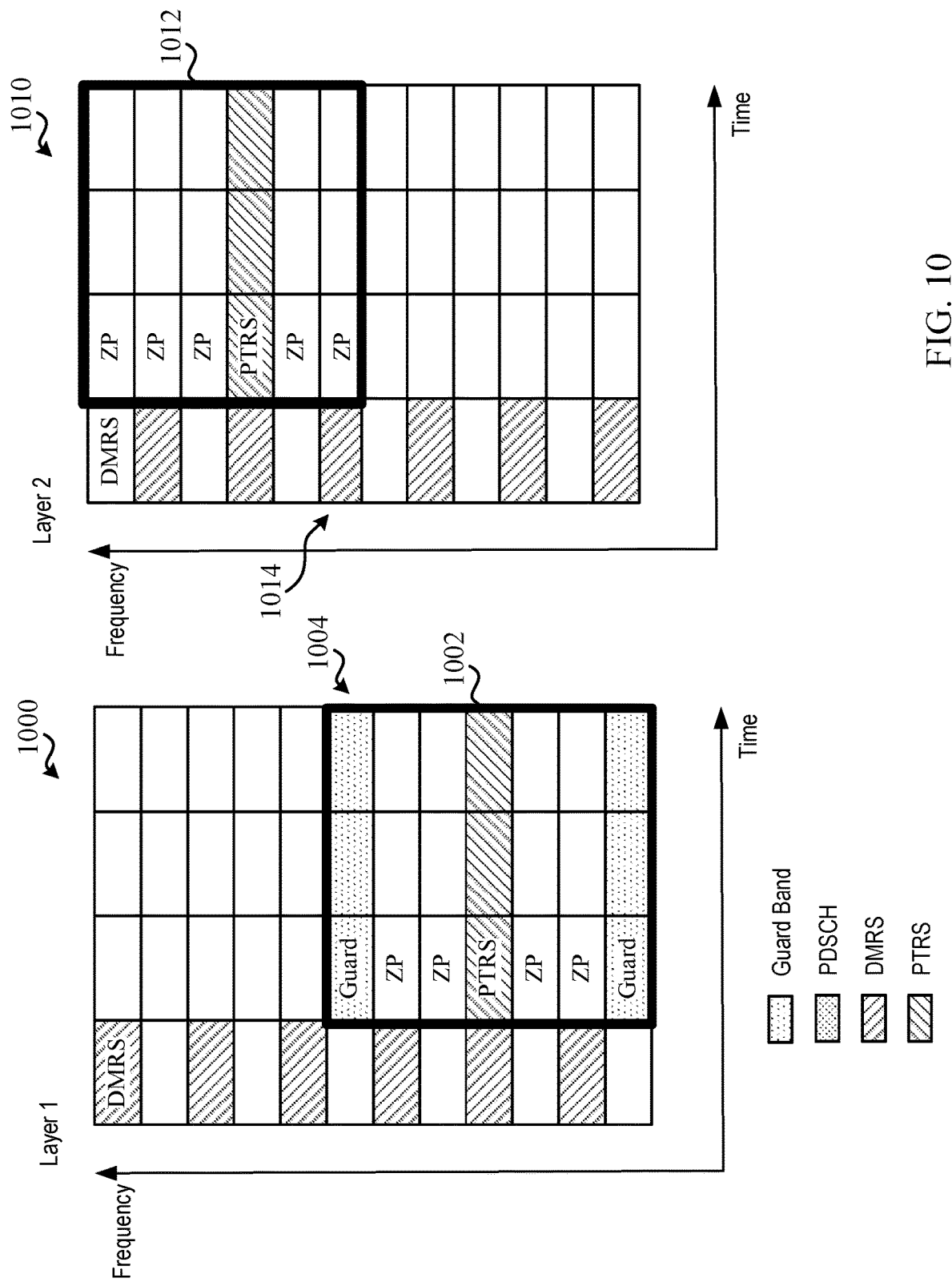
FIG. 10 illustrates an example of resource allocations for multiple antenna ports having clusters of PTRS frequency tones that overlap in a guard band, in accordance with aspects described herein.

FIG. 10 illustrates an example of a resource allocation 1000 for a first antenna layer (Layer 1) and a resource allocation 1010 for a second antenna layer (Layer 2). Resource allocation 1000 includes a cluster 1002 of PTRS frequency tones for transmitting a PTRS for the first antenna layer. The cluster 1002 can include a guard band, ZP PTRS tones, and NZP PTRS tones (which can be aligned with a NZP DMRS tone for the first antenna layer), as described. Resource allocation 1010 can be over the same set of frequency and time resources as resource allocation 1000, and may also include a cluster 1012 of PTRS frequency tones for transmitting a PTRS for the second antenna layer. The cluster 1012 can include a guard band, ZP PTRS tones, and NZP PTRS tones (which can be aligned with a NZP DMRS tone for the second antenna layer), as described. In addition, for example, the cluster 1002 for PTRS of the first antenna layer can overlap the cluster 1012 for PTRS of the second antenna layer in guard band 1004, which overlaps ZP PTRS 1014 in frequency.

Figure 11:
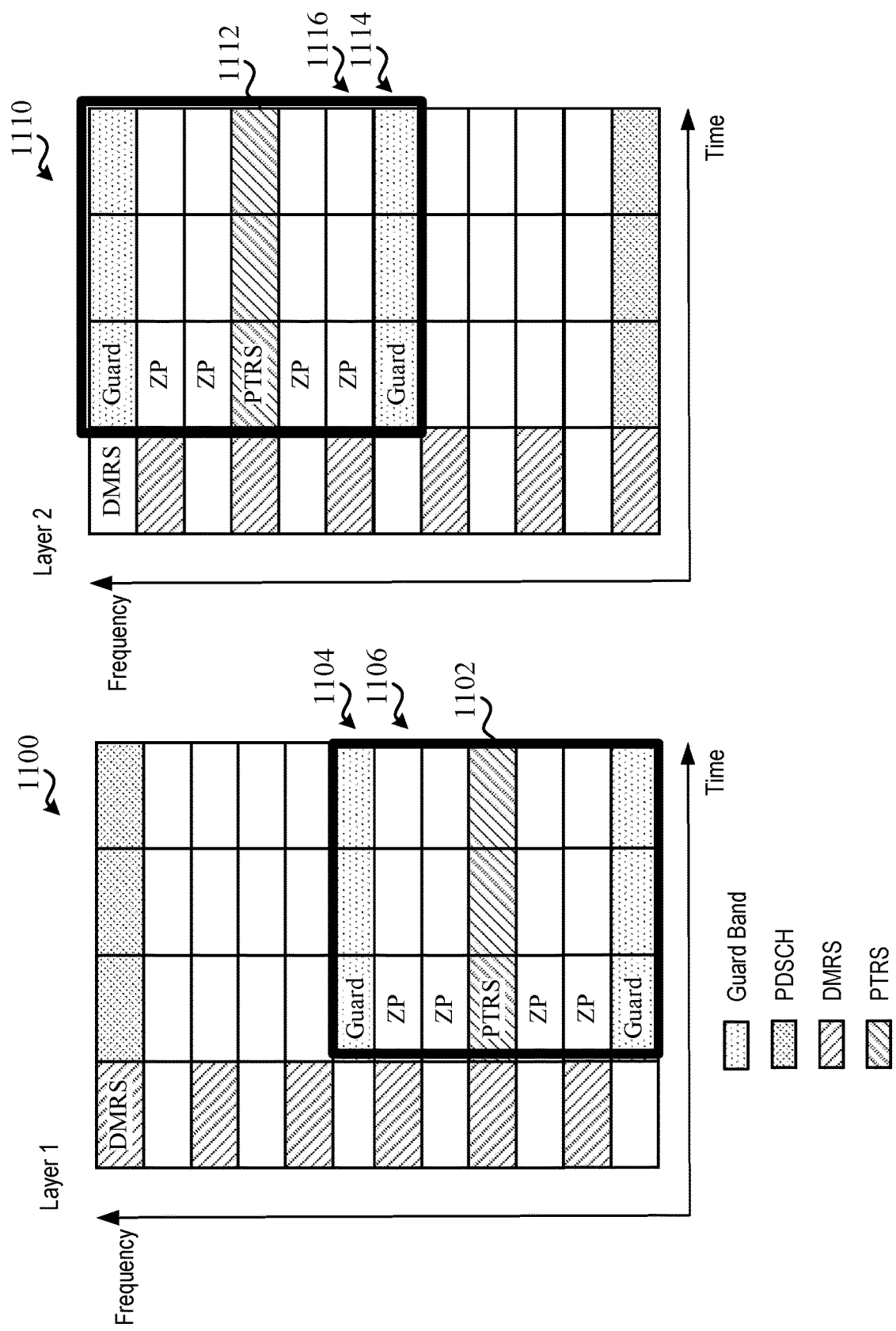
FIG. 11 illustrates an example of resource allocations for multiple antenna ports having clusters of PTRS frequency tones that overlap in a guard band and/or ZP PTRS frequency tones, in accordance with aspects described herein.

FIG. 11 illustrates an example of a resource allocation 1100 for a first antenna layer (Layer 1) and a resource allocation 1110 for a second antenna layer (Layer 2). Resource allocation 1100 includes a cluster 1002 of PTRS frequency tones for transmitting a PTRS for the first antenna layer. The cluster 1102 can include a guard band, ZP PTRS tones, and NZP PTRS tones (which can be aligned with a NZP DMRS tone for the first antenna layer), as described. Resource allocation 1110 can be over the same set of frequency and time resources as resource allocation 1100, and may also include a cluster 1112 of PTRS frequency tones for transmitting a PTRS for the second antenna layer. The cluster 1112 can include a guard band, ZP PTRS tones, and NZP PTRS tones (which can be aligned with a NZP DMRS tone for the second antenna layer), as described. In addition, for example, the cluster 1102 for PTRS of the first antenna layer can overlap the cluster 1112 for PTRS of the second antenna layer in guard band 1104, which overlaps ZP PTRS 1114, and ZP PTRS 1106, which overlaps guard band 1116, in frequency.

Figure 12:
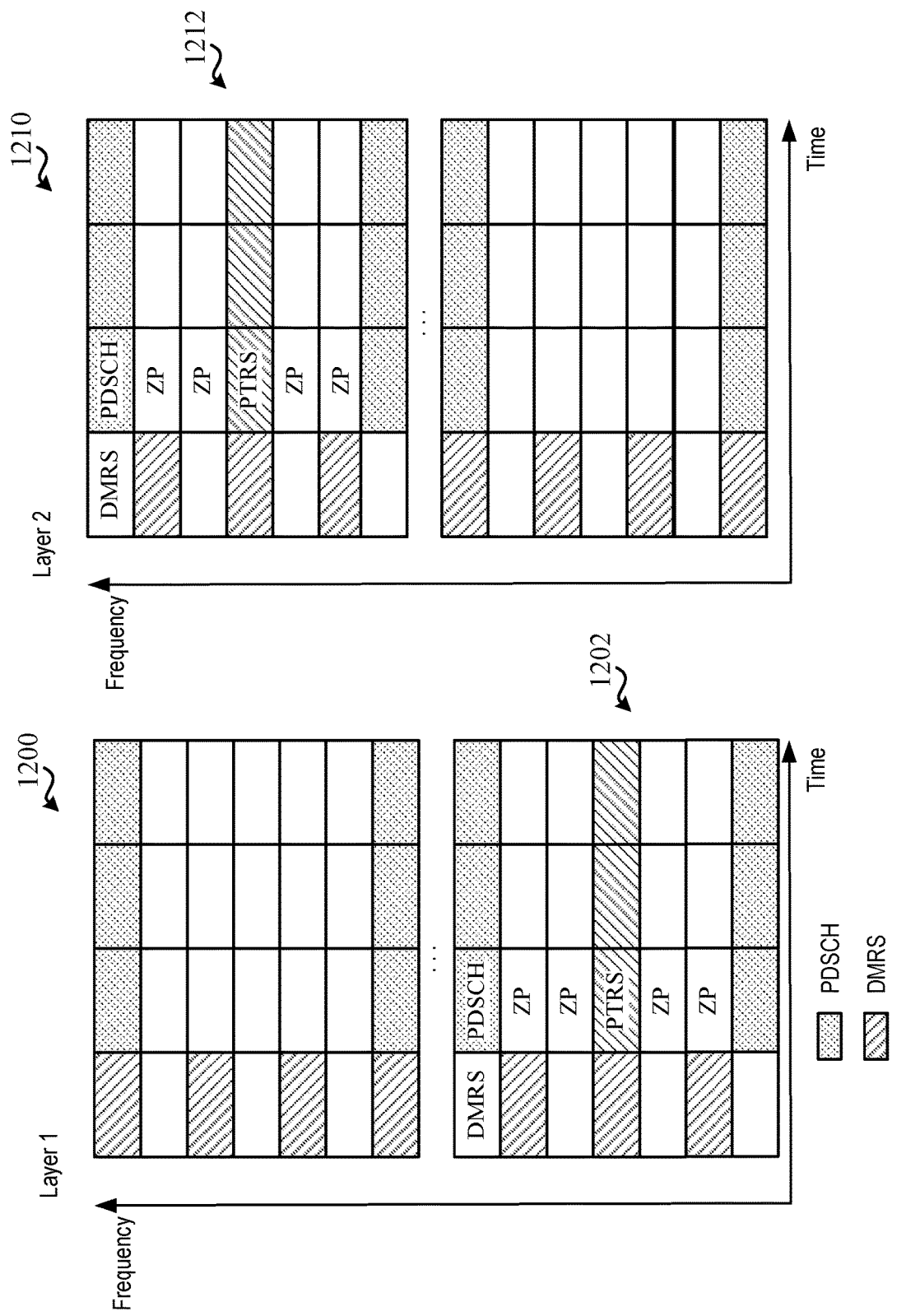
FIG. 12 illustrates an example of resource allocations for multiple antenna ports having clusters of PTRS frequency tones that do not overlap in frequency, in accordance with aspects described herein.

FIG. 12 illustrates an example of a resource allocation 1200 for a first antenna layer (Layer 1) and a resource allocation 1210 for a second antenna layer (Layer 2). Resource allocation 1200 includes a cluster 1202 of PTRS frequency tones for transmitting a PTRS for the first antenna layer. The cluster 1202 can include ZP PTRS tones and NZP PTRS tones (which can be aligned with a NZP DMRS tone for the first antenna layer), as described. Resource allocation 1210 can be over the same set of frequency and time resources as resource allocation 1200, and may also include a cluster 1212 of PTRS frequency tones for transmitting a PTRS for the second antenna layer. The cluster 1212 can include ZP PTRS tones and NZP PTRS tones (which can be aligned with a NZP DMRS tone for the second antenna layer), as described. In addition, for example, the cluster 1202 for PTRS of the first antenna layer does not overlap the cluster 1212 for PTRS of the second antenna layer in frequency.

Figure 13:
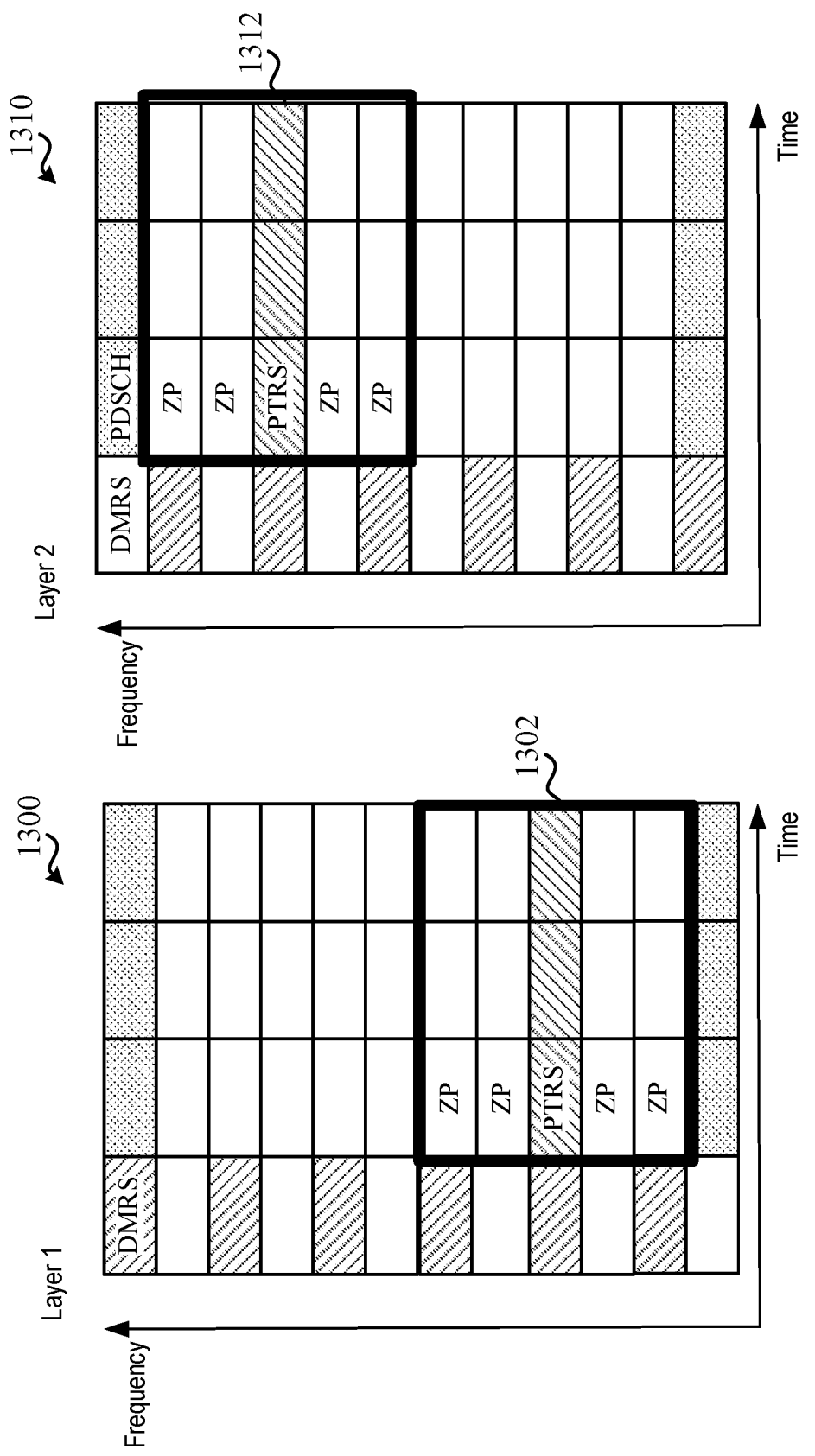
FIG. 13 illustrates an example of resource allocations for multiple antenna ports having clusters of PTRS frequency tones that are adjacent in frequency, in accordance with aspects described herein.

FIG. 13 illustrates an example of a resource allocation 1300 for a first antenna layer (Layer 1) and a resource allocation 1310 for a second antenna layer (Layer 2). Resource allocation 1300 includes a cluster 1302 of PTRS frequency tones for transmitting a PTRS for the first antenna layer. The cluster 1302 can include ZP PTRS tones and NZP PTRS tones (which can be aligned with a NZP DMRS tone for the first antenna layer), as described. Resource allocation 1310 can be over the same set of frequency and time resources as resource allocation 1300, and may also include a cluster 1312 of PTRS frequency tones for transmitting a PTRS for the second antenna layer. The cluster 1312 can include ZP PTRS tones and NZP PTRS tones (which can be aligned with a NZP DMRS tone for the second antenna layer), as described. In addition, for example, the cluster 1302 for PTRS of the first antenna layer does not overlap, but may be adjacent in frequency to, the cluster 1312 for PTRS of the second antenna layer.

In another example, UE RS component 252, or BS RS component 352, can transmit the PTRS and the second PTRS in respective clusters of PTRS frequency tones where the respective clusters may overlap in frequency, but the NZP PTRS frequency tones of each cluster may not overlap. For example, the more overlap that is allowed, the less overhead can be used for PTRS transmission for multiple layers. Examples are shown in FIGS. 14-16.

Figure 14:
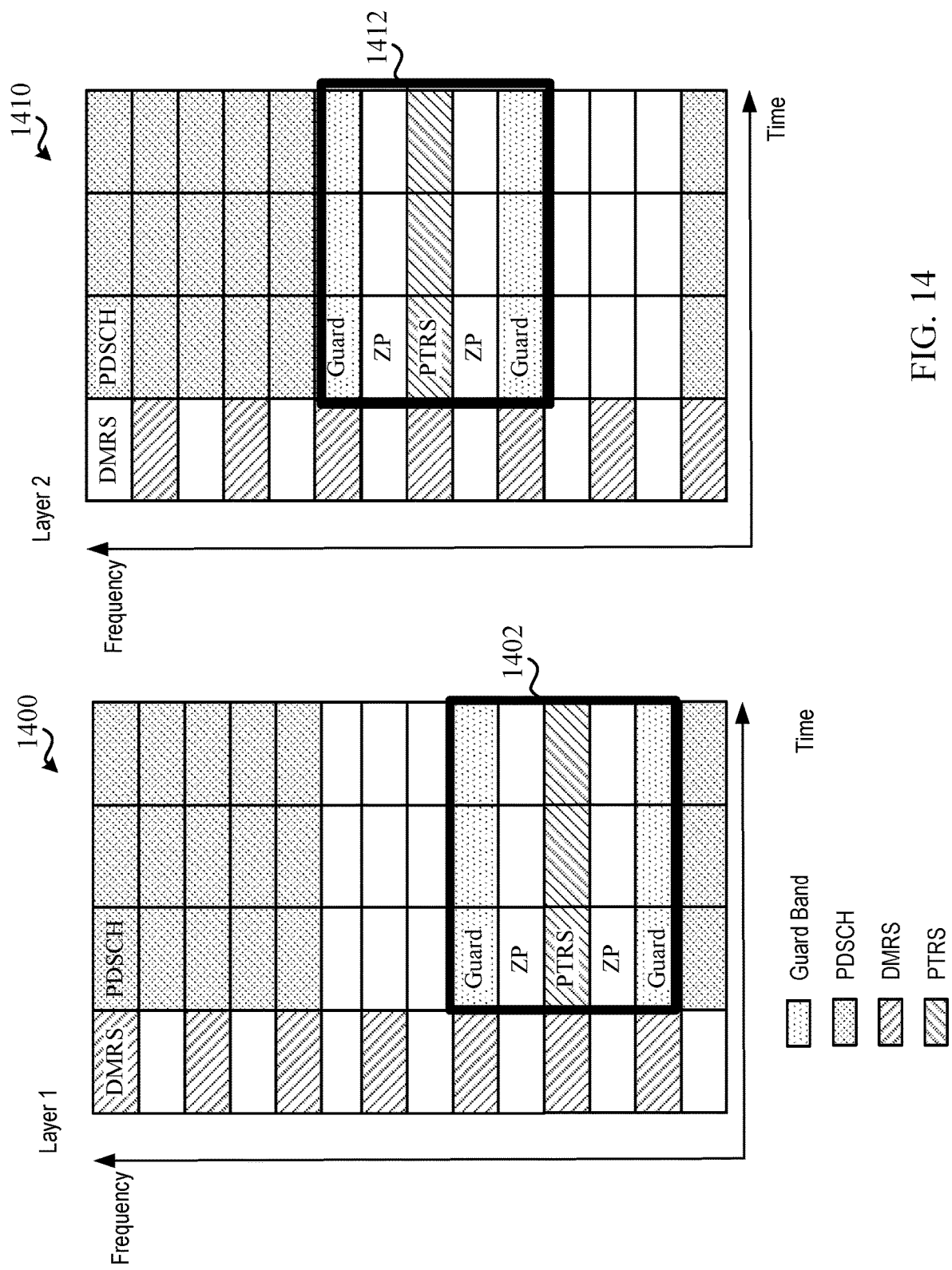
FIG. 14 illustrates an example of resource allocations for multiple antenna ports having clusters of PTRS frequency tones that overlap in a guard band and ZP PTRS frequency tones, in accordance with aspects described herein.

FIG. 14 illustrates an example of a resource allocation 1400 for a first antenna layer (Layer 1) and a resource allocation 1410 for a second antenna layer (Layer 2). Resource allocation 1400 includes a cluster 1402 of PTRS frequency tones for transmitting a PTRS for the first antenna layer. The cluster 1402 can include a guard band, ZP PTRS tones, and NZP PTRS tones (which can be aligned with a NZP DMRS tone for the first antenna layer), as described. Resource allocation 1410 can be over the same set of frequency and time resources as resource allocation 1400, and may also include a cluster 1412 of PTRS frequency tones for transmitting a PTRS for the second antenna layer. The cluster 1412 can include a guard band, ZP PTRS tones, and NZP PTRS tones (which can be aligned with a NZP DMRS tone for the second antenna layer), as described. In addition, for example, the cluster 1402 for PTRS of the first antenna layer can overlap the cluster 1412 for PTRS of the second antenna layer in guard band and ZP PTRS, in frequency, for each cluster 1402 and 1412, as described above. NZP PTRSs for each cluster 1402 and 1412 do not overlap in frequency. In this example, overlapping may only be allowed for a certain number of tones (e.g., 2 tones in this example).

Figure 15:
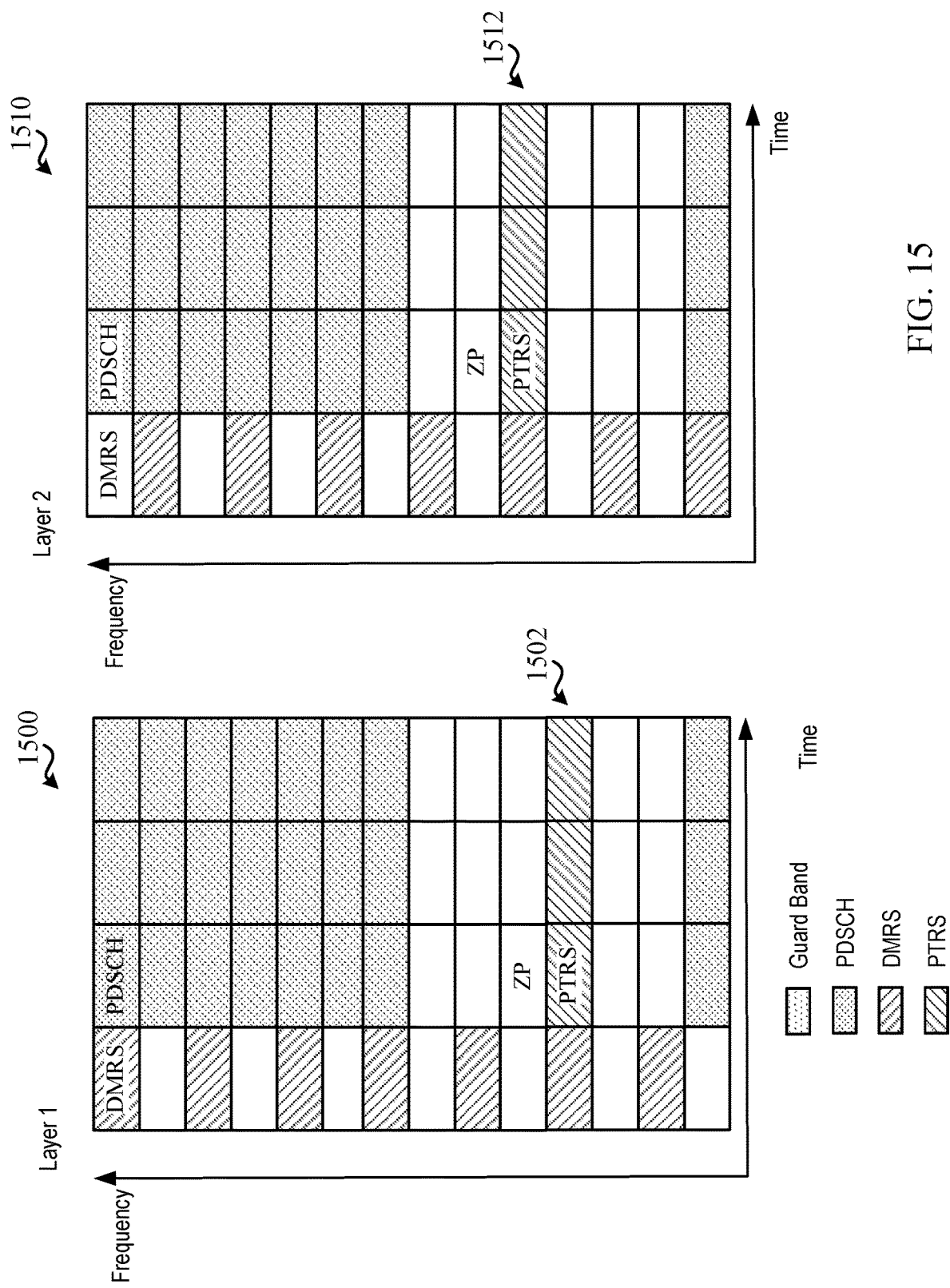
FIG. 15 illustrates an example of resource allocations for multiple antenna ports having clusters of PTRS frequency tones that overlap in ZP PTRS frequency tones, in accordance with aspects described herein.

FIG. 15 illustrates an example of a resource allocation 1500 for a first antenna layer (Layer 1) and a resource allocation 1510 for a second antenna layer (Layer 2). Resource allocation 1500 includes a cluster of PTRS frequency tones for transmitting a PTRS for the first antenna layer, including a NZP PTRS frequency tone 1502 and multiple ZP PTRS frequency tones. Resource allocation 1510 can be over the same set of frequency and time resources as resource allocation 1500, and may also include a cluster of PTRS frequency tones for transmitting a PTRS for the second antenna layer, including NZP PTRS frequency tone 1512, which may not overlap, but may be adjacent in frequency to, NZP PTRS frequency tone 1502. This configuration can include more overlap in frequency than resource allocations in FIG. 14.

Figure 16:
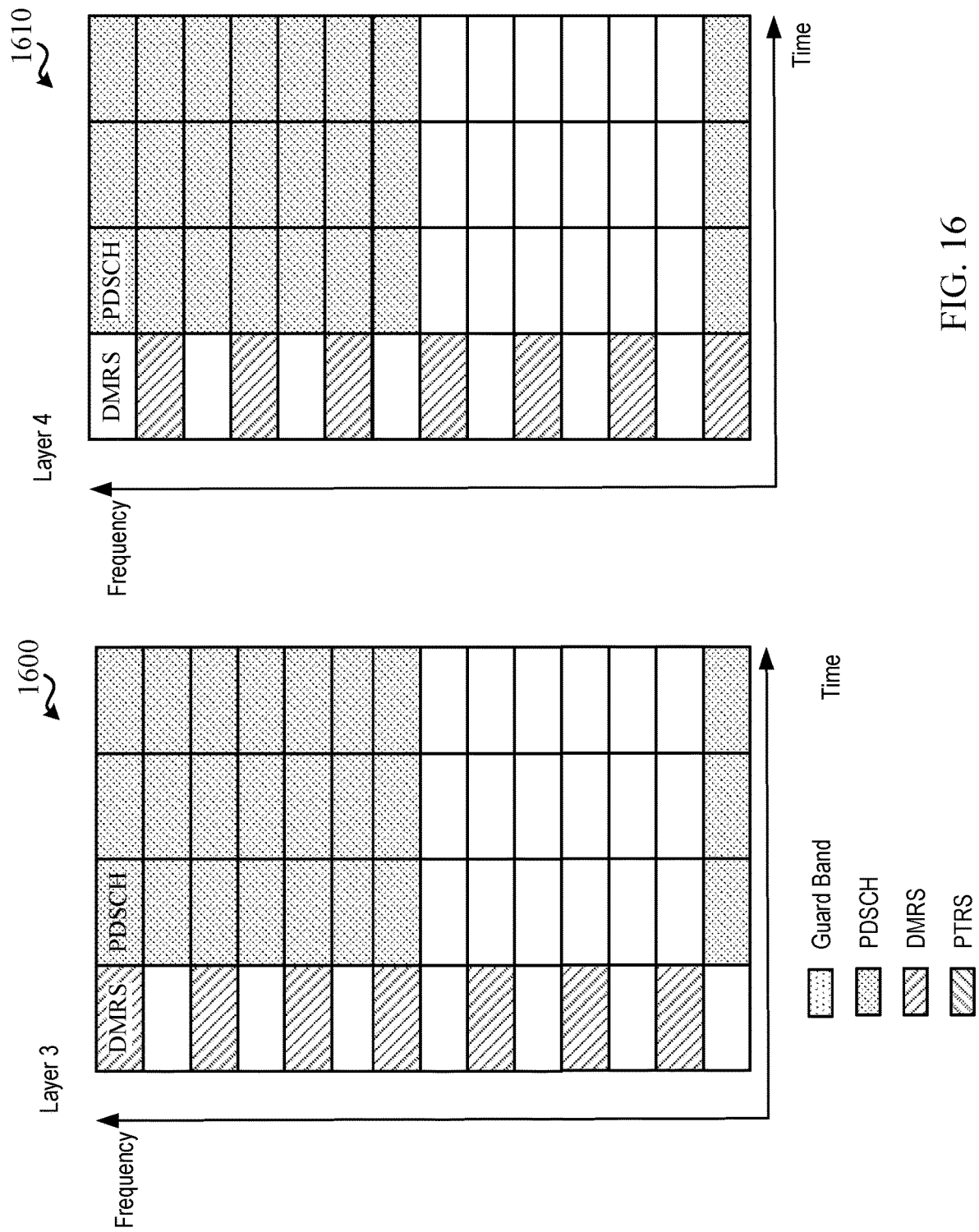
FIG. 16 illustrates an example of resource allocations for multiple antenna ports having clusters of PTRS frequency tones that include only ZP PTRS frequency tones, in accordance with aspects described herein.

FIG. 16 illustrates an example of a resource allocation 1600 for a third antenna layer (Layer 3) and a resource allocation 1610 for a fourth antenna layer (Layer 4). Resource allocations 1600 and 1610 can include clusters of PTRS frequency tones with only ZP PTRS frequency tones. For example, Layer 3 may have similar spatial properties as Layer 1 in FIG. 15 (or other FIGS.), and Layer 4 may have similar spatial properties as Layer 2 in FIG. 15 (or other FIGS.). Thus, PTRS may only be transmitted for Layers 1 and 2, and the resulting signals can be used for de-ICI filter for Layers 1/3 and Layers 2/4, respectively. In this example, Layer 3 and Layer 4 can have the PTRS clusters with only ZP PTRS so as not to transmit data over the resources used for PTRS transmission by Layers 1 and 2. In one example, however, Layer 3 and Layer 4 may use guard bands defined for PTRS clusters in Layers 1 and 2 for transmitting data (e.g., PDSCH or PUSCH).

In the above examples where the clusters of PTRS frequency tones for different antenna ports (or layers) can overlap, optionally at Block 422, an amount of overlap between one or more first ZP frequency tones and one or more second ZP frequency tones for transmitting the PTRS and the second PTRS can be determined. In an aspect, UE RS component 252, e.g., in conjunction with processor(s) 212, memory 216, transceiver 202, UE communicating component 242, etc., can determine the amount of overlap between the one or more first ZP frequency tones (e.g., of the first cluster of PTRS frequency tones) and the one or more second ZP frequency tones (e.g., of the second cluster of PTRS frequency tones) for transmitting the PTRS and the second PTRS. For example, the amount of overlap can be a small number of tones (e.g., as shown and described in FIG. 14) or a large number of tones (e.g., as shown and desired in FIG. 15). In one example, the amount of overlap can be specified in a wireless communication technology standard (e.g., 5G NR), and stored in memory 216 of the UE 104, in which case UE RS component 252 can determine the amount of overlap from memory 216. In another example, the amount of overlap can be indicated in the one or more indications received at Block 406 (e.g., PTRS configuring component 354 can configure the UE 104 with an indication of the amount of overlap).

In another aspect, BS RS component 352, e.g., in conjunction with processor(s) 312, memory 316, transceiver 302, BS communicating component 342, etc., can determine the amount of overlap between the one or more first ZP frequency tones (e.g., of the first cluster of PTRS frequency tones) and the one or more second ZP frequency tones (e.g., of the second cluster of PTRS frequency tones) for transmitting the PTRS and the second PTRS. In either example, UE RS component 252 or BS RS component 352 can transmit the PTRS and second PTRS over corresponding resources that are determined based on the amount of overlap.

In the overlapping examples described above, overlapping PTRS clusters for two antenna layers can use fewer PTRS tones than not allowing overlapping, but the ICI taps (from NZP PTRS) in ZP PTRS tones on one antenna port (or layer) may leak into ZP PTRS tones in another antenna port (or layer), which may cause additional error in estimating ICI when using "leaked" ZP tones in the estimation. In an example, where no overlapping is allowed (or is only allowed in guard band), for example, the ZP PTRS of non-overlapping locations are not used for ICI estimation, so the leakage across port is not an issue. Where overlapping is allowed, the separation between 2 NZP tones of 2 clusters can be used to determine how much PTRS overhead can be saved and how much ICI leakage is left across port in ICI estimation. Large separation can lead to less overhead saving but smaller ICI leakage across tones.

In another example for transmitting PTRS over a cluster of PTRS frequency tones, a DC tone of the allocated bandwidth can be avoided such that no PTRS transmission occurs over the DC tone. For example, the DC tone may receive more background noise from environment, and have more noise or worse signal-to-noise ratio (SNR) than other tones in the bandwidth. Thus, the DC tone can be avoided for putting RS, including ZP and NZP tones, due to the larger noise. Location of the DC tone, in frequency, can be different for transmission and reception in a wireless device. Some wireless communication technologies, such as 5G NR, may specify that at least a transmitter-side DC tone should be informed or known by a receiving device, but may not specify the same for a receiver-side DC tone. A receiver-side DC tone can be different for different UEs and/or different for different transmissions at different frequency bands. In downlink (DL) transmission, gNB may not be required to know a receiver-side DC tone at UE, and may not be able to avoid transmitting PTRS over the receiver-side DC tone without additional information.

In this example, in method 400, optionally at Block 424, a recommended pattern for the PTRS can be transmitted. In an aspect, UE RS component 252, e.g., in conjunction with processor(s) 212, memory 216, transceiver 202, UE communicating component 242, etc., can transmit the recommended pattern for the PTRS (e.g., to a base station 102). For example, the recommended pattern may specify one or more parameters for determining a pattern of PTRS clusters, which UE RS component 252 may determine to avoid using the receiver-side DC tone of the UE 104. Similarly in this example, optionally at Block 426, a recommended pattern for the PTRS can be received. In an aspect, BS RS component 352, e.g., in conjunction with processor(s) 312, memory 316, transceiver 302, BS communicating component 342, etc., can receive the recommended pattern for the PTRS (e.g., from a UE 104). In this example, BS RS component 352 can determine, and/or PTRS configuring component 354 can configure, the cluster(s) of PTRS frequency tones based on the recommended pattern, which may avoid the receiver-side DC tone.

In another example, BS RS component 352 can also determine, and/or PTRS configuring component 354 can configure, the cluster(s) of PTRS frequency tones to avoid the transmitter-side DC tone, which is known by the base station 102. For example, the base station 102 can select PTRS pattern that avoids DC tones by avoiding using transmitter-side and receiver-side DC tones for both ZP and/or NZP PTRS tones. In uplink (UL), the base station 102 can know the transmitter-side and receiver-side DC tones. In DL, the base station 102 may not know the receiver-side DC tone. To facilitate base station 102 to determine the PTRS location, UE 104 may signal the base station 102 the recommended pattern. For example, the UE 104 may signal the base station 102 the recommended or harmful RB offset to allow the base station 102 to determine which RB contains the PTRS bundle, such that the PTRS bundle is not inserted in an RB that includes DC tones.

FIG. 5 illustrates a flow chart of an example of a method 500 for receiving a PTRS over resources allocated in a cluster of multiple PTRS frequency tones, in accordance with aspects described herein. In an example, a UE 104 or base station 102 can perform the functions described in method 500 using one or more of the components described in FIGS. 1-3.

In method 500, at Block 502, a DMRS for an antenna port can be received over a set of multiple DMRS frequency tones in a symbol of a slot based on a DMRS configuration. In an aspect, UE RS component 252, e.g., in conjunction with processor(s) 212, memory 216, transceiver 202, UE communicating component 242, etc., can receive (e.g., from a base station or other node) the DMRS for the antenna port over the set of multiple DMRS frequency tones in the symbol of the slot based on the DMRS configuration, as described above. In another aspect, BS RS component 352, e.g., in conjunction with processor(s) 312, memory 316, transceiver 302, BS communicating component 342, etc., can receive (e.g., from a UE or other node) the DMRS for the antenna port over the set of multiple DMRS frequency tones in the symbol of the slot based on the DMRS configuration, as described above. In an example, the DMRS configuration can be generated by the base station 102 and provided to the UE 104, and the UE 104 or base station 102 can received the DMRS based on the DMRS configuration.

In method 500, at Block 504, a PTRS for the antenna port can be received over a cluster of multiple PTRS frequency tones that are adjacent in frequency in the symbol or a different symbol of the slot. In an aspect, UE RS component 252, e.g., in conjunction with processor(s) 212, memory 216, transceiver 202, UE communicating component 242, etc., can receive (e.g., from a base station or other node) the PTRS for the antenna port over the cluster of multiple PTRS frequency tones that are adjacent in frequency in the symbol or a different symbol of the slot. For example, the UE 104 can receive the PTRS for the same antenna port or layer as the DMRS, and can accordingly receive the PTRS using similar spatial properties. In another aspect, BS RS component 352, e.g., in conjunction with processor(s) 312, memory 316, transceiver 302, BS communicating component 342, etc., can receive (e.g., from a UE or other node) the PTRS for the antenna port over the cluster of multiple PTRS frequency tones adjacent in frequency in the symbol or a different symbol of the slot. Similarly, the base station 102 can receive the PTRS for the same antenna port or layer as the DMRS, and can accordingly receive the PTRS using similar spatial properties, as described.

In an example, the cluster of multiple PTRS frequency tones can be adjacent in frequency (e.g., in neighboring frequency tones) and can be allocated as ZP or NZP frequency tones for PTRS. In an example, the cluster of multiple PTRS frequency tones can include at least one NZP PTRS tone, and can at least partially overlap at least one of the set of multiple DMRS frequency tones, in frequency. For example, at least one NZP PTRS frequency tone in the cluster of multiple PTRS frequency tones can overlap at least one NZP DMRS frequency tone in the set of multiple DMRS frequency tones in frequency. This can allow for channel estimation for the PTRS, as described.

In method 500, optionally at Block 506, one or more indications of the cluster of multiple PTRS frequency tones can be received. In an aspect, UE RS component 252, e.g., in conjunction with processor(s) 212, memory 216, transceiver 202, UE communicating component 242, etc., can receive the one or more indications of the cluster of multiple PTRS frequency tones. For example, the UE 104 can receive the one or more indications in one or more configurations from the base station 102, in memory 216 of the UE 104, which may store hardcoded information or a configuration based on a wireless communication technology standard, such as 5G NR, and/or the like, as described.

Similarly, in method 500, optionally at Block 508, one or more indications of the cluster of multiple PTRS frequency tones can be transmitted. In an aspect, PTRS configuring component 354, e.g., in conjunction with processor(s) 312, memory 316, transceiver 302, BS communicating component 342, etc., can transmit the one or more indications of the cluster of multiple PTRS frequency tones. For example, the base station 102 can transmit the one or more indications in one or more configurations to the UE 104, as described. For example, In one example, PTRS configuring component 354 can transmit, to the UE 104, a list identifying possible clusters of PTRS frequency tones (e.g., in RRC signaling) and/or DCI or MAC-CE with the one or more indications (e.g., indications of an index within the RRC-configured list) of selected cluster(s) for one or more antenna ports. In one example, PTRS configuring component 354 can configure the cluster(s) of PTRS frequency tones based on a capability indicated by the UE 104, as described. In any case, the UE RS component 252, or the BS RS component 352, can receive the PTRS over the cluster of PTRS frequency tones based on the one or more indications and/or over frequency tones identified based on the one or more indications.

In method 500, optionally at Block 510, a capability indication can be transmitted. In an aspect, capability indicating component 254, e.g., in conjunction with processor(s) 212, memory 216, transceiver 202, UE communicating component 242, etc., can transmit the capability indication (e.g., to the base station 102). For example, capability indication component 254 can transmit the capability indication in RRC signaling, etc., as described.

In method 500, optionally at Block 512, a capability indication can be received. In an aspect, PTRS configuring component 354, e.g., in conjunction with processor(s) 312, memory 316, transceiver 302, BS communicating component 342, etc., can receive the capability indication (e.g., from the UE). For example, PTRS configuring component 354 can receive the capability indication in RRC signaling from the UE 104, etc., as described. For example, the one or more indications can include a RRC table of multiple clusters, as described. In a further example, the one or more indications can include a parameter (e.g., RRC parameter) indicating to determine one cluster of multiple PTRS frequency tones (also referred to herein as a "PTRS bundle") every X number of RBs, or in total Y number of PTRS bundles for a bandwidth (e.g., PDSCH or PUSCH BW). In another example, the one or more indications can include a parameter (e.g., RRC parameter) indicating a tone identifier within an RB that includes a PTRS bundle to insert PTRS (e.g., a starting frequency tone of the bundle in an RB for PTRS). In yet another example, the one or more indications can include a parameter (e.g., RRC parameter) indicating the pattern of PTRS tones within a PTRS bundle (e.g., frequency tone locations of ZP and NZP PTRS tones within each of one or more PTRS bundles). In any of the above examples, as described, UE RS component 252 and/or BS RS component 352 can receive the PTRS (e.g., at Block 504) by receiving at least over the NZP PTRS tones in determined frequency tones throughout a bandwidth in one or more symbols of the slot.

In method 500, optionally at Block 514, the DMRS can be received over a different set of multiple DMRS frequency tones in a second symbol of the slot. In an aspect, UE RS component 252, e.g., in conjunction with processor(s) 212, memory 216, transceiver 202, UE communicating component 242, etc., can receive the DMRS over a different set of multiple DMRS frequency tones in a second symbol of the slot. In another aspect, BS RS component 352, e.g., in conjunction with processor(s) 312, memory 316, transceiver 302, BS communicating component 342, etc., can receive the DMRS over a different set of multiple DMRS frequency tones in a second symbol of the slot. In either example, the PTRS frequency tones may or may not overlap any of the frequency tones in the different set of multiple DMRS frequency tones.

In method 500, optionally at Block 516, the PTRS for the antenna port can be received over a different cluster of multiple PTRS frequency tones in the symbol or a different symbol of the slot as well. In an aspect, UE RS component 252, e.g., in conjunction with processor(s) 212, memory 216, transceiver 202, UE communicating component 242, etc., can receive the PTRS for the antenna port over the different cluster of multiple PTRS frequency tones in the symbol or the different symbol of the slot. In another aspect, BS RS component 352, e.g., in conjunction with processor(s) 312, memory 316, transceiver 302, BS communicating component 342, etc., can receive the PTRS for the antenna port over the different cluster of multiple PTRS frequency tones in the symbol or the different symbol of the slot. In this example, the UE RS component 252 and/or BS RS component 252 can receive the PTRS over multiple clusters of PTRS frequency tones, as described.

In method 500, optionally at Block 518, a second PTRS for a second antenna port can be received over a second cluster of multiple PTRS frequency tones in the symbol or a different symbol of the slot as well. In an aspect, UE RS component 252, e.g., in conjunction with processor(s) 212, memory 216, transceiver 202, UE communicating component 242, etc., can receive the second PTRS for the second antenna port over the second cluster of multiple PTRS frequency tones in the symbol or the different symbol of the slot. In another aspect, BS RS component 352, e.g., in conjunction with processor(s) 312, memory 316, transceiver 302, BS communicating component 342, etc., can receive the second PTRS for the second antenna port over the second cluster of multiple PTRS frequency tones in the symbol or the different symbol of the slot. For example, if multiple antenna ports or layers share the same PN or phase errors, NZP PTRS for one port (e.g., in one layer) may be sufficient. Otherwise, NZP PTRS can be inserted for multiple ports (or layers) where phase errors differ in the ports (or layers). In an example, the PTRS clusters for multiple layers may use different clusters of PTRS frequency tones that may be subject to one or more overlapping constraints with respect to one another, as described above.

In another example for transmitting PTRS over a cluster of PTRS frequency tones, a DC tone of the allocated bandwidth can be avoided, as described above. In this example, in method 500, optionally at Block 520, a recommended pattern for the PTRS can be transmitted. In an aspect, UE RS component 252, e.g., in conjunction with processor(s) 212, memory 216, transceiver 202, UE communicating component 242, etc., can transmit the recommended pattern for the PTRS (e.g., to a base station 102). For example, the recommended pattern may specify one or more parameters for determining a pattern of PTRS clusters, which UE RS component 252 may determine to avoid using the receiver-side DC tone of the UE 104. Similarly in this example, optionally at Block 522, a recommended pattern for the PTRS can be received. In an aspect, BS RS component 352, e.g., in conjunction with processor(s) 312, memory 316, transceiver 302, BS communicating component 342, etc., can receive the recommended pattern for the PTRS (e.g., from a UE 104). In this example, BS RS component 352 can determine, and/or PTRS configuring component 354 can configure, the cluster(s) of PTRS frequency tones based on the recommended pattern, which may avoid the receiver-side DC tone, as described. In an example, the UE 104 can receive the PTRS based on the recommended pattern.

In method 500, optionally at Block 524, phase noise can be computed based on the PTRS. In an aspect, UE RS component 252, e.g., in conjunction with processor(s) 212, memory 216, transceiver 202, UE communicating component 242, etc., can compute the phase noise based on the PTRS (e.g., as received from the base station 102). In another aspect, BS RS component 352, e.g., in conjunction with processor(s) 312, memory 316, transceiver 302, BS communicating component 342, etc., can compute the phase noise based on the PTRS (e.g., as received from the UE 104). In an example, this can include deriving a de-ICI filter based on the PTRS. For example, in a frequency domain implementation, UE RS component 252, or BS RS component 352, can solve IC coefficients (vector b) using least square and then derive the de-ICI filter according to:

$$\begin{bmatrix} y[1] \\ y[2] \\ \dots \\ y[k-1] \end{bmatrix} = \begin{bmatrix} H_2s[2] & H_1s[1] & H_0s[0] \\ H_3s[2] & H_2s[2] & H_1s[1] \\ \dots & \dots & \dots \\ H_ks[k] & H_{k-1}s[k-1] & H_{k-2}s[k-2] \end{bmatrix} \begin{bmatrix} b[-1] \\ b[0] \\ b[1] \end{bmatrix} + \begin{bmatrix} n[1] \\ n[2] \\ \dots \\ n[k-1] \end{bmatrix}$$

where H is the channel, y is the received signal, s is the transmitted signal, and n is the noise on each NZP PTRS tone. For ZP PTRS tones, as s=0, then H*s=0 for any H, and channel H is not needed. Channel H can be known for each PTRS tone before solving the least square problem.

Figure 17:
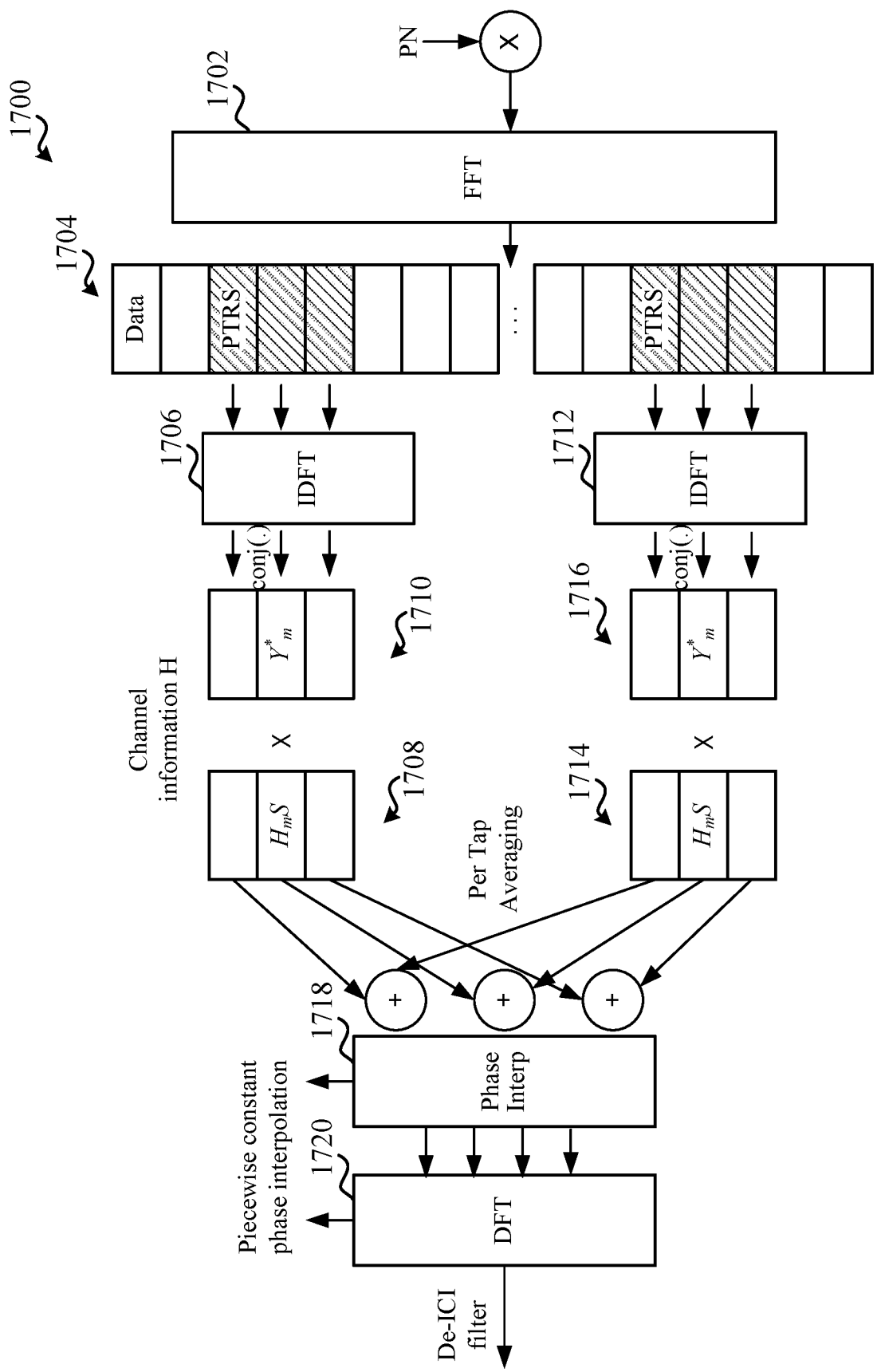
FIG. 17 illustrates an example of a process for deriving a de-inter-carrier interference (ICI) filter.

In another example, computing the phase noise or deriving the de-ICI filter in the time domain can be based on channel information. FIG. 17 illustrates an example of an operation 1700 for deriving the de-ICI filter. In operation 1700, a fast Fourier transform (FFT) operation 1702 can be performed on a received signal to obtain symbols 1704. One or more inverse discrete Fourier transform (IDFT) operations 1706, 1712 can be performed on the symbols to determine channel information H 1708, 1714 separate from the received signal y 1710, 1716. Per tap averaging can be performed on the channel information H 1708, 1714 and the result can be phase interpolated at 1718, which may include performing piecewise constant phase interpolation. A discrete Fourier transform (DFT) operation can be performed on the resulting interpolated phase at 1720 to derive the de-ICI filter. The base station 102 or UE 104 can use the de-ICI filter (e.g., with one or more RF front end components 288, 388) to cancel or correct ICI in received signals. For example, the DMRS that uses the same frequency as the NZP PTRS can be used to obtain channel information H 1708, 1714 for generating the de-ICI filter based on the PTRS and/or determined phase noise.

In one example, in method 500, optionally at Block 526, a local oscillator (LO) of a transceiver can be adjusted based on the phase noise or ICI. In an aspect, UE RS component 252, e.g., in conjunction with processor(s) 212, memory 216, transceiver 202, UE communicating component 242, etc., can adjust the LO of the transceiver (e.g., transceiver 202) based on the phase noise. In another aspect, BS RS component 352, e.g., in conjunction with processor(s) 312, memory 316, transceiver 302, BS communicating component 342, etc., can adjust the LO of the transceiver (e.g., transceiver 302) based on the phase noise.

Figure 18:
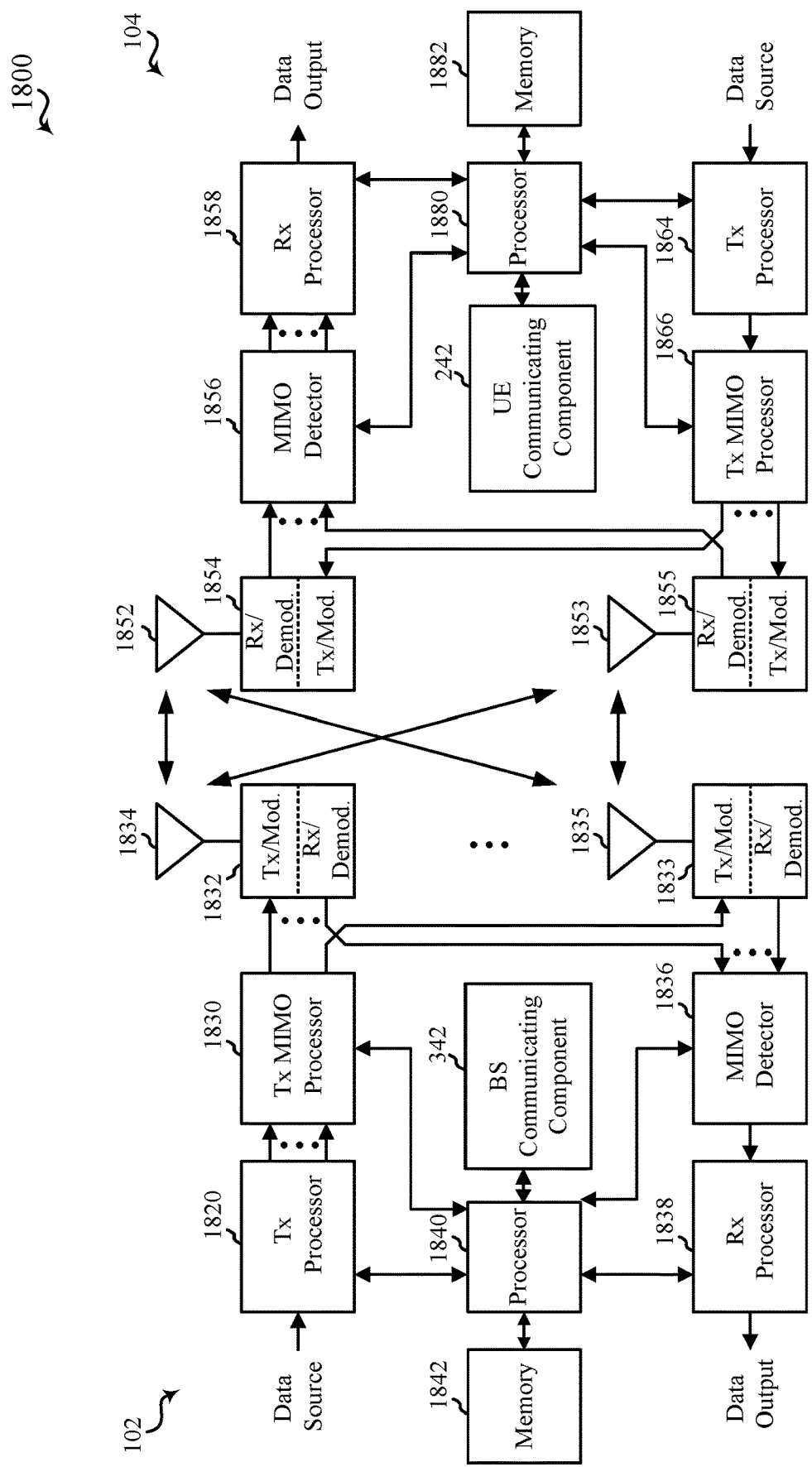
FIG. 18 is a block diagram illustrating an example of a MIMO communication system including a base station and a UE, in accordance with various aspects of the present disclosure.

FIG. 18 is a block diagram of a MIMO communication system 1800 including a base station 102 and a UE 104. The MIMO communication system 1800 may illustrate aspects of the wireless communication access network 100 described with reference to FIG. 1. The base station 102 may be an example of aspects of the base station 102 described with reference to FIG. 1. The base station 102 may be equipped with antennas 1834 and 1835, and the UE 104 may be equipped with antennas 1852 and 1853. In the MIMO communication system 1800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1820 may receive data from a data source. The transmit processor 1820 may process the data. The transmit processor 1820 may also generate control symbols or reference symbols. A transmit MIMO processor 1830 may perform spatial processing (e.g., precoding) on data symbols, control symbols, or reference symbols, if applicable, and may provide output symbol streams to the transmit modulator/demodulators 1832 and 1833. Each modulator/demodulator 1832 through 1833 may process a respective output symbol stream (e.g., for OFDM, etc.) to obtain an output sample stream. Each modulator/demodulator 1832 through 1833 may further process (e.g., convert to analog, amplify, filter, and upconvert) the output sample stream to obtain a DL signal. In one example, DL signals from modulator/demodulators 1832 and 1833 may be transmitted via the antennas 1834 and 1835, respectively.

The UE 104 may be an example of aspects of the UEs 104 described with reference to FIGS. 1-2. At the UE 104, the UE antennas 1852 and 1853 may receive the DL signals from the base station 102 and may provide the received signals to the modulator/demodulators 1854 and 1855, respectively. Each modulator/demodulator 1854 through 1855 may condition (e.g., filter, amplify, downconvert, and digitize) a respective received signal to obtain input samples. Each modulator/demodulator 1854 through 1855 may further process the input samples (e.g., for OFDM, etc.) to obtain received symbols. A MIMO detector 1856 may obtain received symbols from the modulator/demodulators 1854 and 1855, perform MIMO detection on the received symbols, if applicable, and provide detected symbols. A receive (Rx) processor 1858 may process (e.g., demodulate, deinterleave, and decode) the detected symbols, providing decoded data for the UE 104 to a data output, and provide decoded control information to a processor 1880, or memory 1882.

The processor 1880 may in some cases execute stored instructions to instantiate a UE communicating component 242 (see e.g., FIGS. 1 and 2).

On the uplink (UL), at the UE 104, a transmit processor 1864 may receive and process data from a data source. The transmit processor 1864 may also generate reference symbols for a reference signal. The symbols from the transmit processor 1864 may be precoded by a transmit MIMO processor 1866 if applicable, further processed by the modulator/demodulators 1854 and 1855 (e.g., for SC-FDMA, etc.), and be transmitted to the base station 102 in accordance with the communication parameters received from the base station 102. At the base station 102, the UL signals from the UE 104 may be received by the antennas 1834 and 1835, processed by the modulator/demodulators 1832 and 1833, detected by a MIMO detector 1836 if applicable, and further processed by a receive processor 1838. The receive processor 1838 may provide decoded data to a data output and to the processor 1840 or memory 1842.

The processor 1840 may in some cases execute stored instructions to instantiate a BS communicating component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 1800. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 1800.

The following aspects are illustrative only and aspects thereof may be combined with aspects of other embodiments or teaching described herein, without limitation.

Aspect 1 is a method for wireless communication including transmitting a DMRS for an antenna port over a set of multiple DMRS frequency tones in a symbol of a slot based on a DMRS configuration, and transmitting a PTRS for the antenna port over a cluster of multiple PTRS frequency tones in the symbol or a different symbol of the slot, wherein the cluster of multiple PTRS frequency tones are adjacent to one another in frequency, and wherein at least one PTRS frequency tone in the cluster of multiple PTRS frequency tones is a NZP PTRS frequency tone that overlaps, in frequency, at least one DMRS frequency tone in the set of DMRS frequency tones.

In Aspect 2, the method of Aspect 1 includes transmitting the DMRS over a different set of multiple DMRS frequency tones in a second symbol of the slot, where the at least one PTRS frequency tone does not overlap, in frequency, at least one DMRS frequency tone in the different set of DMRS frequency tones.

In Aspect 3, the method of any of Aspects 1 or 2 includes where transmitting the PTRS includes transmitting the PTRS with the DMRS in the symbol of the slot, and further comprising scaling at least one of the PTRS or the DMRS based on a power boosting factor.

In Aspect 4, the method of Aspect 3 includes where the power boosting factor is based on at least one of a number of zero power PTRS tones indicated for the PTRS or a configuration from a base station.

In Aspect 5, the method of any of Aspects 1 to 4 includes transmitting the PTRS for the antenna port over a different cluster of multiple PTRS frequency tones in the symbol or a different symbol of the slot.

In Aspect 6, the method of any of Aspects 1 to 5 includes receiving, from a base station, an indication of the cluster of multiple PTRS frequency tones including at least one of a size or tone location of the cluster of multiple PTRS frequency tones.

In Aspect 7, the method of Aspect 6 includes transmitting a capability indication regarding at least one of a supported cluster size, a supported number of clusters, a cluster pattern, or a number of zero power PTRSs within a cluster, where receiving the indication of the cluster of multiple PTRS frequency tones is based at least in part on the capability indication.

In Aspect 8, the method of Aspect 7 includes determining the capability indication based on at least one of a MCS or a bandwidth assigned for communicating with the base station.

In Aspect 9, the method of any of Aspects 6 to 8 includes receiving, from the base station, a RRC table indicating multiple possible configurations of PTRS clusters, where receiving the indication includes receiving, from the base station, an index into the RRC table to determine the cluster of multiple PTRS frequency tones.

In Aspect 10, the method of any of Aspects 6 to 9 includes where receiving the indication includes receiving, from the base station, an interval indication of clusters of multiple PTRS frequency tones in each of a number of resource blocks.

In Aspect 11, the method of Aspect 10 includes where receiving the indication further includes receiving, from the base station, an index indication of a RB index within each of the number of RBs as a start of a corresponding cluster of multiple PTRS frequency tones.

In Aspect 12, the method of any of Aspects 6 to 11 includes where receiving the indication includes receiving, from the base station, a number of clusters of multiple PTRS frequency tones in an assigned bandwidth.

In Aspect 13, the method of any of Aspects 1 to 12 includes transmitting, to a UE, an indication of the cluster of multiple PTRS frequency tones including at least one of a size or tone location of the cluster of multiple PTRS frequency tones.

Aspect 14, the method of Aspect 13 includes receiving, from the UE, a capability indication regarding at least one of a supported cluster size, a supported number of clusters, a cluster pattern, or a number of zero power PTRSs within a cluster, where transmitting the indication of the cluster of multiple PTRS frequency tones is based at least in part on the capability indication.

In Aspect 15, the method of any of Aspects 13 or 14 includes transmitting, to the UE, a RRC table indicating multiple possible configurations of PTRS clusters, where transmitting the indication includes transmitting, to the UE, an index into the RRC table to determine the cluster of multiple PTRS frequency tones.

In Aspect 16, the method of any of Aspects 13 to 15 includes where transmitting the indication includes transmitting, to the UE, an interval indication of clusters of multiple PTRS frequency tones in each of a number of resource blocks.

In Aspect 17, the method of Aspect 16 includes where transmitting the indication further includes transmitting, to the UE, an index indication of a RB index within each of the number of RBs as a start of a corresponding cluster of multiple PTRS frequency tones.

In Aspect 18, the method of any of Aspects 13 to 17 includes where transmitting the indication includes transmitting, to the UE, a number of clusters of multiple PTRS frequency tones in an assigned bandwidth.

In Aspect 19, the method of any of Aspects 1 to 18 includes where the cluster of multiple PTRS frequency tones are adjacent, in frequency, to a guard band of one or more frequency tones.

In Aspect 20, the method of Aspect 19 includes where the guard band includes zero power frequency tones.

In Aspect 21, the method of any of Aspects 19 or 20 includes where the guard band includes non-zero power frequency tones consistent with a cyclic prefix of the PTRS.

In Aspect 22, the method of Aspect 21 includes where the guard band does not overlap, in frequency, the set of DMRS frequency tones.

In Aspect 23, the method of any of Aspects 1 to 22 includes where transmitting the PTRS includes transmitting the PTRS in a single frequency tone in the cluster of multiple PTRS frequency tones, where a remaining portion of frequency tones in the cluster of multiple PTRS frequency tones are zero power.

In Aspect 24, the method of any of Aspects 1 to 23 includes transmitting a second DMRS for a second antenna port over a second set of multiple DMRS frequency tones in the symbol of the slot based on the DMRS configuration, and transmitting a second PTRS for the second antenna port over a second cluster of multiple PTRS frequency tones in the symbol or a different symbol of the slot, where at least one PTRS frequency tone in the second cluster of multiple PTRS frequency tones overlaps, in frequency, at least one DMRS frequency tone in the second set of DMRS frequency tones.

In Aspect 25, the method of Aspect 24 includes where the cluster of multiple PTRS frequency tones and the second cluster of multiple PTRS frequency tones do not overlap in frequency.

In Aspect 26, the method of Aspect 25 includes where the cluster of multiple PTRS frequency tones are adjacent, in frequency, to a first guard band of one or more frequency tones, and where the second cluster of multiple PTRS frequency tones are adjacent, in frequency, to a second guard band of one or more frequency tones, where the first guard band overlaps the second guard band in frequency.

In Aspect 27, the method of any of Aspects 24 to 26 includes where the cluster of multiple PTRS frequency tones include one or more first zero power PTRS frequency tones, and where the second cluster of multiple PTRS frequency tones include one or more second zero power PTRS frequency tones, where the one or more first zero power PTRS frequency tones do not overlap the one or more second zero power PTRS frequency tones in frequency.

In Aspect 28, the method of any of Aspects 24 to 27 includes where the cluster of multiple PTRS frequency tones include one or more first zero power PTRS frequency tones, and where the second cluster of multiple PTRS frequency tones include one or more second zero power PTRS frequency tones, where the one or more first zero power PTRS frequency tones at least partially overlap the one or more second zero power PTRS frequency tones in frequency.

In Aspect 29, the method of Aspect 28 includes determining an amount of overlap between the one or more first zero power PTRS frequency tones and the one or more second zero power PTRS frequency tones for transmitting the PTRS and the second PTRS.

In Aspect 30, the method of Aspect 29 includes where determining the amount of overlap is based in part on receiving, in a configuration, an indication of the amount of overlap.

In Aspect 31, the method of any of Aspects 28 to 30 includes where transmitting the second PTRS includes transmitting the second PTRS in one or more non-zero power frequency tones of the second cluster of multiple PTRS frequency tones that overlap, in frequency, the one or more first zero power PTRS frequency tones.

In Aspect 32, the method of any of Aspects 24 to 31 includes where the cluster of multiple PTRS frequency tones are adjacent, in frequency, to a first guard band of one or more frequency tones, and where the second cluster of multiple PTRS frequency tones are adjacent, in frequency, to a second guard band of one or more frequency tones, and further comprising transmitting data over tones in at least one of the first guard band or the second guard band.

In Aspect 33, the method of any of Aspects 1 to 32 includes where the cluster of multiple PTRS frequency tones do not include a DC tone.

In Aspect 34, the method of Aspect 33 includes transmitting, to a base station, a recommended pattern for the PTRS, where the cluster of multiple PTRS frequency tones is based on the pattern.

Aspect 35 is a method for wireless communication including receiving a DMRS for an antenna port over a set of multiple DMRS frequency tones in a symbol of a slot based on a DMRS configuration, receiving a PTRS for the antenna port over a cluster of multiple PTRS frequency tones in the symbol or a different symbol of the slot, where the cluster of multiple PTRS frequency tones are adjacent to one another in frequency, and where at least one PTRS frequency tone in the cluster of multiple PTRS frequency tones is a NZP PTRS frequency tone that overlaps, in frequency, at least one DMRS frequency tone in the set of DMRS frequency tones, and adjusting a local oscillator of a transceiver based on a phase noise computed from the PTRS.

In Aspect 36, the method of Aspect 35 includes receiving the DMRS over a different set of multiple DMRS frequency tones in a second symbol of the slot, where the at least one PTRS frequency tone does not overlap, in frequency, at least one DMRS frequency tone in the different set of DMRS frequency tones.

In Aspect 37, the method of any of Aspects 35 or 36 includes receiving the PTRS for the antenna port over a different cluster of multiple PTRS frequency tones in the symbol or a different symbol of the slot.

In Aspect 38, the method of any of Aspects 35 to 37 includes receiving, from a base station, an indication of the cluster of multiple PTRS frequency tones including at least one of a size or tone location of the cluster of multiple PTRS frequency tones.

Aspect 39, the method of Aspect 38 includes transmitting a capability indication regarding at least one of a supported cluster size, a supported number of clusters, a cluster pattern, or a number of zero power PTRSs within a cluster, where receiving the indication of the cluster of multiple PTRS frequency tones is based at least in part on the capability indication.

In Aspect 40, the method of Aspect 39 includes determining the capability indication based on at least one of a modulation and coding scheme (MCS) or a bandwidth assigned for communicating with the base station.

In Aspect 41, the method of any of Aspects 38 to 40 includes receiving, from the base station, a RRC table indicating multiple possible configurations of PTRS clusters, where receiving the indication includes receiving, from the base station, an index into the RRC table to determine the cluster of multiple PTRS frequency tones.

In Aspect 42, the method of any of Aspects 38 to 41 includes where receiving the indication includes receiving, from the base station, an interval indication of clusters of multiple PTRS frequency tones in each of a number of resource blocks.

In Aspect 43, the method of Aspect 42 includes where receiving the indication further includes receiving, from the base station, an index indication of a RB index within each of the number of RBs as a start of a corresponding cluster of multiple PTRS frequency tones.

In Aspect 44, the method of any of Aspects 38 to 43 includes where receiving the indication includes receiving, from the base station, a number of clusters of multiple PTRS frequency tones in an assigned bandwidth.

In Aspect 45, the method of any of Aspects 35 to 44 includes transmitting, to a UE, an indication of the cluster of multiple PTRS frequency tones including at least one of a size or tone location of the cluster of multiple PTRS frequency tones.

In Aspect 46, the method of Aspect 45 includes receiving, from the UE, a capability indication regarding at least one of a supported cluster size, a supported number of clusters, a cluster pattern, or a number of zero power PTRSs within a cluster, where transmitting the indication of the cluster of multiple PTRS frequency tones is based at least in part on the capability indication.

In Aspect 47, the method of any of Aspects 45 or 46 includes transmitting, to the UE, a RRC table indicating multiple possible configurations of PTRS clusters, where transmitting the indication includes transmitting, to the UE, an index into the RRC table to determine the cluster of multiple PTRS frequency tones.

In Aspect 48, the method of any of Aspects 45 to 47 includes where transmitting the indication includes transmitting, to the UE, an interval indication of clusters of multiple PTRS frequency tones in each of a number of resource blocks.

In Aspect 49, the method of any of Aspects 45 to 48 includes where transmitting the indication further includes transmitting, to the UE, an index indication of a RB index within each of the number of RBs as a start of a corresponding cluster of multiple PTRS frequency tones.

In Aspect 50, the method of any of Aspects 45 to 49 includes where transmitting the indication includes transmitting, to the UE, a number of clusters of multiple PTRS frequency tones in an assigned bandwidth.

In Aspect 51, the method of any of Aspects 35 to 50 includes where the cluster of multiple PTRS frequency tones are adjacent, in frequency, to a guard band of one or more frequency tones.

In Aspect 52, the method of Aspect 51 includes where the guard band includes zero power frequency tones.

In Aspect 53, the method of any of Aspects 51 or 52 includes where the guard band includes non-zero power frequency tones consistent with a cyclic prefix of the PTRS.

In Aspect 54, the method of Aspect 53 includes where the guard band does not overlap, in frequency, the set of DMRS frequency tones.

In Aspect 55, the method of any of Aspects 35 to 54 includes where receiving the PTRS includes receiving the PTRS in a single frequency tone in the cluster of multiple PTRS frequency tones, where a remaining portion of frequency tones in the cluster of multiple PTRS frequency tones are zero power.

In Aspect 56, the method of any of Aspects 35 to 55 includes receiving a second DMRS for a second antenna port over a second set of multiple DMRS frequency tones in the symbol of the slot based on the DMRS configuration, receiving a second PTRS for the second antenna port over a second cluster of multiple PTRS frequency tones in the symbol or a different symbol of the slot, where at least one PTRS frequency tone in the second cluster of multiple PTRS frequency tones overlaps, in frequency, at least one DMRS frequency tone in the second set of DMRS frequency tones.

In Aspect 57, the method of Aspect 56 includes where the cluster of multiple PTRS frequency tones and the second cluster of multiple PTRS frequency tones do not overlap in frequency.

In Aspect 58, the method of Aspect 57 includes where the cluster of multiple PTRS frequency tones are adjacent, in frequency, to a first guard band of one or more frequency tones, and where the second cluster of multiple PTRS frequency tones are adjacent, in frequency, to a second guard band of one or more frequency tones, where the first guard band overlaps the second guard band in frequency.

In Aspect 59, the method of any of Aspects 56 to 58 includes where the cluster of multiple PTRS frequency tones include one or more first zero power PTRS frequency tones, and where the second cluster of multiple PTRS frequency tones include one or more second zero power PTRS frequency tones, where the one or more first zero power PTRS frequency tones do not overlap the one or more second zero power PTRS frequency tones in frequency.

In Aspect 60, the method of any of Aspects 56 to 59 includes where the cluster of multiple PTRS frequency tones include one or more first zero power PTRS frequency tones, and where the second cluster of multiple PTRS frequency tones include one or more second zero power PTRS frequency tones, where the one or more first zero power PTRS frequency tones at least partially overlap the one or more second zero power PTRS frequency tones in frequency.

In Aspect 61, the method of any of Aspects 56 to 60 includes where the cluster of multiple PTRS frequency tones are adjacent, in frequency, to a first guard band of one or more frequency tones, and where the second cluster of multiple PTRS frequency tones are adjacent, in frequency, to a second guard band of one or more frequency tones, and further comprising receiving data over tones in at least one of the first guard band or the second guard band.

In Aspect 62, the method of any of Aspects 35 to 61 includes where the cluster of multiple PTRS frequency tones do not include a DC tone.

In Aspect 63, the method of Aspect 62 includes transmitting, to a base station, a recommended pattern for the PTRS, where the cluster of multiple PTRS frequency tones is based on the pattern.

Aspect 64 is an apparatus for wireless communication including a transceiver, a memory configured to store instructions, and one or more processors communicatively coupled with the memory and the transceiver, where the one or more processors are configured to perform one or more of the methods of any of Aspects 1 to 63.

Aspect 65 is an apparatus for wireless communication including means for performing one or more of the methods of any of Aspects 1 to 63.

Aspect 66 is a computer-readable medium including code executable by one or more processors for wireless communications, the code including code for performing one or more of the methods of any of Aspects 1 to 63.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
a memory configured to store instructions; and
one or more processors communicatively coupled with the memory and the transceiver, wherein the one or more processors are configured to:
transmit a demodulation reference signal (DMRS) for an antenna port over a set of multiple DMRS frequency tones in a symbol of a slot based on a DMRS configuration;
transmit a phase tracking reference signal (PTRS) for the antenna port over a cluster of multiple PTRS frequency tones in the symbol or a different symbol of the slot, wherein the cluster of multiple PTRS frequency tones are adjacent to one another in frequency, and wherein at least one PTRS frequency tone in the cluster of multiple PTRS frequency tones is a non-zero power (NZP) PTRS frequency tone that overlaps, in frequency, at least one DMRS frequency tone in the set of multiple DMRS frequency tones;
transmit a second DMRS for a second antenna port over a second set of multiple DMRS frequency tones in the symbol of the slot based on the DMRS configuration; and
transmit a second PTRS for the second antenna port over a second cluster of multiple PTRS frequency tones in the symbol or a different symbol of the slot, wherein at least one PTRS frequency tone in the second cluster of multiple PTRS frequency tones overlaps, in frequency, at least one DMRS frequency tone in the second set of multiple DMRS frequency tones.

2. The apparatus of claim 1, wherein the one or more processors are further configured to transmit the DMRS over a different set of multiple DMRS frequency tones in a second symbol of the slot, wherein the at least one PTRS frequency tone does not overlap, in frequency, at least one DMRS frequency tone in the different set of multiple DMRS frequency tones.

3. The apparatus of claim 1, wherein the one or more processors are configured to transmit the PTRS with the DMRS in the symbol of the slot, and wherein the one or more processors are further configured to scale at least one of the PTRS or the DMRS based on a power boosting factor.

4. The apparatus of claim 1, wherein the one or more processors are further configured to transmit the PTRS for the antenna port over a different cluster of multiple PTRS frequency tones in the symbol or a different symbol of the slot.

5. The apparatus of claim 1, wherein the one or more processors are further configured to receive, from a base station, an indication of the cluster of multiple PTRS frequency tones including at least one of a size or tone location of the cluster of multiple PTRS frequency tones.

6. The apparatus of claim 5, wherein the one or more processors are further configured to transmit a capability indication regarding at least one of a supported cluster size, a supported number of clusters, a cluster pattern, or a number of zero power PTRSs within a cluster, wherein the one or more processors are configured to receive the indication of the cluster of multiple PTRS frequency tones based at least in part on the capability indication.

7. The apparatus of claim 5, wherein the one or more processors are configured to receive the indication as an interval indication of clusters of multiple PTRS frequency tones in each of a number of resource blocks (RBs) and an index indication of a RB index within each of the number of RBs as a start of a corresponding cluster of multiple PTRS frequency tones.

8. The apparatus of claim 1, wherein the one or more processors are further configured to transmit, to a user equipment (UE), an indication of the cluster of multiple PTRS frequency tones including at least one of a size or tone location of the cluster of multiple PTRS frequency tones.

9. The apparatus of claim 8, wherein the one or more processors are further configured to receive, from the UE, a capability indication regarding at least one of a supported cluster size, a supported number of clusters, a cluster pattern, or a number of zero power PTRSs within a cluster, wherein transmitting the indication of the cluster of multiple PTRS frequency tones is based at least in part on the capability indication.

10. The apparatus of claim 8, wherein the one or more processors are further configured to transmit the indication as an interval indication of clusters of multiple PTRS frequency tones in each of a number of resource blocks (RBs), and an index indication of a RB index within each of the number of RBs as a start of a corresponding cluster of multiple PTRS frequency tones.

11. The apparatus of claim 1, wherein the cluster of multiple PTRS frequency tones are adjacent, in frequency, to a guard band of one or more frequency tones.

12. The apparatus of claim 11, wherein the guard band includes zero power frequency tones.

13. The apparatus of claim 11, wherein the guard band includes non-zero power frequency tones consistent with a cyclic prefix of the PTRS.

14. The apparatus of claim 13, wherein the guard band does not overlap, in frequency, the set of multiple DMRS frequency tones.

15. The apparatus of claim 1, wherein the one or more processors are configured to transmit the PTRS in a single frequency tone in the cluster of multiple PTRS frequency tones, wherein a remaining portion of frequency tones in the cluster of multiple PTRS frequency tones are zero power.

16. The apparatus of claim 1, wherein the cluster of multiple PTRS frequency tones and the second cluster of multiple PTRS frequency tones do not overlap in frequency.

17. The apparatus of claim 16, wherein the cluster of multiple PTRS frequency tones are adjacent, in frequency, to a first guard band of one or more frequency tones, and wherein the second cluster of multiple PTRS frequency tones are adjacent, in frequency, to a second guard band of one or more frequency tones, wherein the first guard band overlaps the second guard band in frequency.

18. The apparatus of claim 1 wherein the cluster of multiple PTRS frequency tones include one or more first zero power PTRS frequency tones, and wherein the second cluster of multiple PTRS frequency tones include one or more second zero power PTRS frequency tones, wherein the one or more first zero power PTRS frequency tones do not overlap the one or more second zero power PTRS frequency tones in frequency.

19. The apparatus of claim 1 wherein the cluster of multiple PTRS frequency tones include one or more first zero power PTRS frequency tones, and wherein the second cluster of multiple PTRS frequency tones include one or more second zero power PTRS frequency tones, wherein the one or more first zero power PTRS frequency tones at least partially overlap the one or more second zero power PTRS frequency tones in frequency.

20. The apparatus of claim 19, wherein the one or more processors are further configured to determine an amount of overlap between the one or more first zero power PTRS frequency tones and the one or more second zero power PTRS frequency tones for transmitting the PTRS and the second PTRS.

21. The apparatus of claim 19, wherein the one or more processors are configured to transmit the second PTRS in one or more non-zero power frequency tones of the second cluster of multiple PTRS frequency tones that overlap, in frequency, the one or more first zero power PTRS frequency tones.

22. The apparatus of claim 1 wherein the cluster of multiple PTRS frequency tones are adjacent, in frequency, to a first guard band of one or more frequency tones, and wherein the second cluster of multiple PTRS frequency tones are adjacent, in frequency, to a second guard band of one or more frequency tones, and wherein the one or more processors are further configured to transmit data over tones in at least one of the first guard band or the second guard band.

23. The apparatus of claim 1, wherein the cluster of multiple PTRS frequency tones do not include a direct current (DC) tone.

24. The apparatus of claim 23, wherein the one or more processors are further configured to transmit, to a base station, a recommended pattern for the PTRS, wherein the cluster of multiple PTRS frequency tones is based on the recommended pattern.

25. An apparatus for wireless communication, comprising:
    a transceiver;
    a memory configured to store instructions; and
    one or more processors communicatively coupled with the memory and the transceiver, wherein the one or more processors are configured to:
        receive a demodulation reference signal (DMRS) for an antenna port over a set of multiple DMRS frequency tones in a symbol of a slot based on a DMRS configuration;
        receive a phase tracking reference signal (PTRS) for the antenna port over a cluster of multiple PTRS frequency tones in the symbol or a different symbol of the slot, wherein the cluster of multiple PTRS frequency tones are adjacent to one another in frequency, and wherein at least one PTRS frequency tone in the cluster of multiple PTRS frequency tones is a non-zero power (NZP) PTRS frequency tone that overlaps, in frequency, at least one DMRS frequency tone in the set of multiple DMRS frequency tones;

receive a second DMRS for a second antenna port over a second set of multiple DMRS frequency tones in the symbol of the slot based on the DMRS configuration; and receive a second PTRS for the second antenna port over a second cluster of multiple PTRS frequency tones in the symbol or a different symbol of the slot, wherein at least one PTRS frequency tone in the second cluster of multiple PTRS frequency tones overlaps, in frequency, at least one DMRS frequency tone in the second set of multiple DMRS frequency tones.

26. The apparatus of claim 25, wherein the one or more processors are further configured to receive the DMRS over a different set of multiple DMRS frequency tones in a second symbol of the slot, wherein the at least one PTRS frequency tone does not overlap, in frequency, at least one DMRS frequency tone in the different set of multiple DMRS frequency tones.

27. The apparatus of claim 25, wherein the one or more processors are further configured to receive the PTRS for the antenna port over a different cluster of multiple PTRS frequency tones in the symbol or a different symbol of the slot.

28. The apparatus of claim 25, wherein the one or more processors are further configured to adjust a local oscillator of a transceiver based on a phase noise computed from the PTRS.

29. A method for wireless communication, comprising:
transmitting a demodulation reference signal (DMRS) for an antenna port over a set of multiple DMRS frequency tones in a symbol of a slot based on a DMRS configuration;

transmitting a phase tracking reference signal (PTRS) for the antenna port over a cluster of multiple PTRS frequency tones in the symbol or a different symbol of the slot, wherein the cluster of multiple PTRS frequency tones are adjacent to one another in frequency, and wherein at least one PTRS frequency tone in the cluster of multiple PTRS frequency tones is a non-zero power (NZP) PTRS frequency tone that overlaps, in frequency, at least one DMRS frequency tone in the set of multiple DMRS frequency tones;

transmitting a second DMRS for a second antenna port over a second set of multiple DMRS frequency tones in the symbol of the slot based on the DMRS configuration; and transmitting a second PTRS for the second antenna port over a second cluster of multiple PTRS frequency tones in the symbol or a different symbol of the slot, wherein at least one PTRS frequency tone in the second cluster of multiple PTRS frequency tones overlaps, in frequency, at least one DMRS frequency tone in the second set of multiple DMRS frequency tones.

30. A method for wireless communication, comprising:
receiving a demodulation reference signal (DMRS) for an antenna port over a set of multiple DMRS frequency tones in a symbol of a slot based on a DMRS configuration;

receiving a phase tracking reference signal (PTRS) for the antenna port over a cluster of multiple PTRS frequency tones in the symbol or a different symbol of the slot, wherein the cluster of multiple PTRS frequency tones are adjacent to one another in frequency, and wherein at least one PTRS frequency tone in the cluster of multiple PTRS frequency tones is a non-zero power (NZP) PTRS frequency tone that overlaps, in frequency, at least one DMRS frequency tone in the set of multiple DMRS frequency tones;

receiving a second DMRS for a second antenna port over a second set of multiple DMRS frequency tones in the symbol of the slot based on the DMRS configuration; and receiving a second PTRS for the second antenna port over a second cluster of multiple PTRS frequency tones in the symbol or a different symbol of the slot, wherein at least one PTRS frequency tone in the second cluster of multiple PTRS frequency tones overlaps, in frequency, at least one DMRS frequency tone in the second set of multiple DMRS frequency tones.

* * * * *